United States Patent [19]
Woessner et al.

[11] Patent Number: 5,398,787
[45] Date of Patent: Mar. 21, 1995

[54] DAMPING PILOT VALVE HAVING VIBRATION DAMPER-RELATED CHARACTERISTIC CURVES

[75] Inventors: Felix Woessner, Schweinfurt; Manfred Grundei, Niederwerrn, both of Germany

[73] Assignee: Fichtel & Sachs AG, Schweinfurt, Germany

[21] Appl. No.: 101,675

[22] Filed: Aug. 4, 1993

Related U.S. Application Data

[63] Continuation of Ser. No. 832,728, Feb. 7, 1992, abandoned.

[30] Foreign Application Priority Data

Feb. 11, 1991 [DE] Germany .................. 41 04 110.0

[51] Int. Cl.⁶ .................. B60G 17/08; F16F 9/50
[52] U.S. Cl. .................. 188/299; 188/322.13; 188/315; 188/318
[58] Field of Search .......... 188/299, 318, 281, 282, 188/315, 316, 317, 311, 322.13, 322.14, 322.15, 322.22, 298; 280/707, 714

[56] References Cited

U.S. PATENT DOCUMENTS

| | | | |
|---|---|---|---|
| 4,650,042 | 3/1987 | Knecht et al. | 188/299 |
| 4,802,561 | 2/1989 | Knecht et al. | 188/318 |
| 4,850,460 | 7/1989 | Knecht et al. | 188/299 |
| 4,880,086 | 11/1989 | Knecht et al. | 188/299 |
| 5,163,706 | 11/1992 | Maguran, Jr. et al. | 188/299 X |
| 5,180,039 | 1/1993 | Axthammer et al. | 188/299 |

FOREIGN PATENT DOCUMENTS

| | | |
|---|---|---|
| 0330634 | 8/1989 | European Pat. Off. |
| 0364757 | 4/1990 | European Pat. Off. |
| 3348176 | 4/1985 | Germany |
| 3434877 | 4/1986 | Germany |
| 3609862 | 10/1987 | Germany |
| 3712477 | 10/1987 | Germany |
| 3719113 | 8/1988 | Germany |
| 3729187 | 3/1989 | Germany |
| 3807322 | 7/1989 | Germany |

Primary Examiner—Douglas C. Butler
Attorney, Agent, or Firm—Brumbaugh, Graves, Donohue & Raymond

[57] ABSTRACT

In the case of a vibration damper with a by-pass (32, 32a) between an annular working chamber and a compensating chamber (28), there is in the by-pass (32, 32a) a shut-off valve assembly (36) with a valve shut-off element (42) and a valve seat (40b). The valve shut-off element (42) is for its part subject to the pressure ($p_1$) in a first section (32) of the by-pass and on the other to the pressure ($p_2$) in a control chamber (48). The cross-section of a control chamber outlet (46c) can be controlled by an outlet cross-section dimensioning device (52). The shut-off valve assembly (36) is so constructed that at maximum control chamber outlet cross-section the valve shut-off element (42) begins to be lifted off the valve seat (40b) when the throughflow rate through the control chamber outlet (46c) amounts to at least 0.2 times the total throughflow rate through the shut-off valve assembly (36) which becomes adjusted to a damper velocity of 1 m/sec.

28 Claims, 13 Drawing Sheets

DAMPING PILOT VALVE HAVING VIBRATION DAMPER-RELATED CHARACTERISTIC CURVES

This application is a continuation of application Ser. No. 07/832,728, filed on Feb. 7, 1992, now abandoned.

BACKGROUND OF THE INVENTION

The invention relates to a vibration damper, comprising a cylinder with an axis, a piston rod passing movably in an axial direction through at least one cylinder end, a piston being connected inside the cylinder to the piston rod, a plurality of fluid chambers variable in capacity and in relation to one another as a function of the movement of the piston rod relative to the cylinder and fluid connections between at least two of the fluid chambers, wherein at least one of the fluid connections comprises a shut-off valve assembly between two sections of this fluid connection, and wherein the shut-off valve assembly is constructed with at least one valve seat adjacent to which there is a first section, and wherein further a first side of a valve shut-off element can be pressed resiliently against the valve seat into a shut-off position for the first section, and wherein further a second side of the valve shut-off element remote from the first side of the valve shut-off element, adjacent a control chamber can be subjected to the action of the fluid pressure in this control chamber, wherein the control chamber is connected to the first section via a throttle section which passes through the valve shut-off element and wherein furthermore the control chamber communicates with the second section via a control chamber outlet, and wherein an outlet cross-section dimensioning means is associated with this control chamber outlet, and wherein the outlet cross-section dimensioning means is adjustable to a plurality of positions which respectively condition various outlet cross-sections of the control chamber outlet.

STATEMENT OF THE PRIOR ART

Such a vibration damper is known from DE-PS 36 09 862. Where this vibration damper is concerned, it is envisaged that only the quantity of damping fluid needed to operate the valve shut-off element is passed through the throttle section which connects the first section to the control chamber. The vibration damper characteristic curves are therefore determined almost exclusively by the valve shut-off element which operates as a function of the pressure. In a chart in which the total throughflow rate through the shut-off valve assembly is plotted on the abscissa while the pressure difference between the greater pressure prevailing in the first section and the lesser pressure prevailing in the second section is plotted on the ordinates, the latter pressure being referred to as the total pressure difference, characteristic curves result which after a steep and not very variable rise show a bend already at low rates of throughflow and then extend in a shallow rise towards higher throughflow rates. With diminishing control chamber outlet cross-section, the bend point shifts towards a higher total pressure difference. Such characteristic curves are not appropriate to vibration damping on account of the greatly limited "preliminary opening range", i.e. they do not show the same pattern as one would expect in a vibration damper which admits of a free configuration of the characteristic curve. In order nevertheless to achieve characteristic curves the pattern of which comes closer to being appropriate to a vibration damper, it would be necessary during the vibration damper stroke to undertake control interventions, i.e. the control chamber outlet cross-section would need to be altered during one stroke of the vibration damper. For this purpose, additional sensors, rapid signal processing and rapidly reacting valves would be needed. This would complicate the construction of the vibration damper and reduce the reliability of the vibration damper.

OBJECT OF THE INVENTION

In contrast, the object of the invention is to provide a vibration damper in which characteristic curves appropriate to vibration damping can be guaranteed without the need for any additional regulating intervention during a damper stroke.

SUMMARY OF THE INVENTION

According to the invention, this problem is resolved by such a design of the shut-off valve assembly that when the outlet cross-section dimensioning means is set for the maximum cross-section of the control chamber outlet, the valves shut-off element starts to lift off from the valve seat when the throughflow rate through the control chamber outlet (throughflow quantity per unit of time) amounts to at least 0.2 times the total throughflow rate through the shut-off valve assembly which adjusts itself in response to a damper velocity of 1 m/sec. In this case, damper velocity refers to the relative velocity of the piston rod in relation to the cylinder.

This requirement is valid regardless of the design of any existing piston valve assembly and/or bottom valve assembly within the vibration damper, since when the outlet cross-section dimensioning means is set to maximum cross-section of the control chamber outlet (softest setting), the throughflow conditions in the piston valve assembly or bottom valve assembly can be disregarded.

According to the invention, a relatively high rate of flow through the control chamber outlet is required to lift the valve shut-off element off the valve seat. Therefore, until this rate of throughflow is reached, the vibration damper characteristic curve is determined by the throttle section through the valve shut-off element and the cross-section of the control chamber outlet. Viewed in the previously described diagram, the result is, in a first portion of the characteristic curve, starting from the point of origin of the diagram, a parabolic trace extending over a relatively large range of throughflow rates. Once the throughflow rate required to lift the valve shut-off element off the valve seat has been exceeded, the vibration damper characteristic is determined by the pressure-dependently operative valve shut-off element and extends in a second portion of the characteristic curve as a straight line showing a shallow rise to higher rates of throughflow. In the case of the vibration damper according to the invention, therefore, vibration damper-related characteristic curves can be guaranteed without any regulating intervention during a stroke of the vibration damper.

By such a design of the shut-off valve assembly that both the maximum cross-section of the control chamber outlet and also the cross-section of the throttle section amount to at least 1/150 of a fluid displacement cross-section of the vibration damper, it is possible to ensure that, when the outlet cross-section dimensioning means is adjusted to the maximum cross-section of control chamber outlet, the valve shut-off element starts to lift off already at a relatively low total pressure difference, for example of less than 15 bars. In this case, the term fluid displacement cross-section of the vibration damper must be understood to be the effective displacement cross-section of the piston rod in the compression stage, which corresponds to the relevant throughflow rate through the fluid connection containing the shut-off valve assembly. By way of simplification, the effective cross-section of the piston rod can be equated with the geometrical cross-section of the piston rod, because one must accept the premise that the throughflow rate through a possibly existing additional bottom valve arrangement (which corresponds to the hardest operating mode of the vibration damper piston) is small compared with the rate of throughflow through the fluid connection containing the shut-off valve assembly with the control chamber outlet cross-section opened to the maximum.

In accordance with a first solution suggested by the invention, it is envisaged that independently of the cross-section of the control chamber outlet, the valve shut-off element starts to lift off the valve seat at least above a limit value of the control chamber outlet cross-section, always at the same throughflow rate through the control chamber outlet, the lifting-off occurring with diminishing control chamber outlet cross-section and increasing pressure difference between the pressure prevailing in the first section and the pressure prevailing in the second section.

This first solution in principle can be realised for example in that the valve shut-off element, when in its shut-off position, has on both its sides substantially identical surface areas for the pressure prevailing in the first section and the pressure prevailing in the control chamber, and in that the cross-section of the throttle section is independent of the cross-section of the control chamber outlet.

According to a modified form of the first principle of solution, it is envisaged that independently of the cross-section of the control chamber outlet the valve shut-off element starts to lift off the valve seat above a limit value of the control chamber outlet cross-section, always at the same throughflow rate through the control chamber outlet, the lifting off occurring for diminishing control chamber outlet cross-section with increasing pressure difference between the pressure prevailing in the first section and the pressure prevailing in the second section, and in that the lifting of the valve shut-off element off the valve seat starts at less than the limit value of the control chamber outlet cross-section with further diminishing control chamber outlet cross-section regardless of the flow rate through the control chamber outlet at a constant predetermined pressure difference between thepressure prevailing in the first section and the pressure prevailing in the second section. Consequently, it is possible to avoid a pressure overload on the shut-off valve assembly.

This modified principle of solution can be realised for example in that in its shut-off position, the valve shut-off element, when in its shut-off position, has on both its sides substantially identical surface areas available to or for application of the pressure prevailing in the first section and the pressure prevailing in the control chamber, and in that the cross-section of the throttle section is independent of the cross-section of the control chamber outlet and in that there is a pressure-relief valve which opens from the control chamber to the second section at the predetermined pressure difference.

According to a second principle of solution of the invention, it is envisaged that lifting off of the valve shut-off element starts for diminishing control chamber outlet cross-section with diminishing throughflow rates through the control chamber outlet and increasing pressure differences between the pressure prevailing in the first section and the pressure prevailing in the second section. With this embodiment, therefore, it is possible merely by varying the control chamber outlet cross-section, to achieve a range of vibration damper characteristic curves which correspond to the characteristic curves of conventional vibration dampers attuned for varying degrees of softness (=varying degrees of riding comfort). The vibration dampers constructed in accordance with this principle of solution thus satisfy the requirement for vibration damper-related characteristic curves to the optimum degree.

This second principle of solution can be realised substantially in that the valve shut-off element, when in its shutting-off position, has on both sides constant surface areas available for the pressure prevailing in the first section and the pressure prevailing in the control chamber, and in cross-section of the throttle section likewise diminishes with diminishing control chamber outlet cross-section.

Alternatively, this second principle of solution can also be realised in that the valve shut-off element, when in its shut-off position, has on both sides constant surface areas available for the pressure prevailing in the first section and the pressure prevailing in the control chamber wherein, when the control chamber outlet is closed, the hydraulic force exerted on the valve shut-off element by the pressure in the first section is greater than the hydraulic force exerted on the valve shut-off element by the pressure in the control chamber, and in that the cross-section of the throttle section is independent of the cross-section of the control chamber outlet.

The previously explained principles of solution and the manners in which they can be implemented can also be advantageous regardless of the exact dimension details described in claims 1 and 2 for the attainment of vibration damper-related characteristic curves.

The invention can be applied to various types of vibration damper. For example, the invention can be applied to twin tube vibration dampers, in which the fluid connection containing the shut-off valve assembly is provided between the compensating chamber and the fluid chamber on the same side as the piston rod and in which the valves in the vibration damper piston and at the bottom of the cylinder are so attuned to one another that regardless of the direction of movement of the piston rod in relation to the cylinder a fluid flow through the fluid connection always takes place in the same direction, namely from the fluid chamber on the piston rod side to the compensating chamber. Where such an embodiment is concerned, the shut-off valve assembly is blocked for the operating mode entailing the hardest damping, so that only the valves in the vibration damper piston and in the bottom of the cylinder open. For softer damping, the cross-section of the control chamber outlet is opened to various degrees, the greatest opening of the control chamber outlet corresponding to the softest damping.

At the same time, there are various ways of connecting the valves of a piston valve assembly and the valves of a bottom valve assembly.

A first possibility is as follows:

The bottom valve assembly comprises only one non-return valve which opens during the tension stroke and closes during the compression stroke. The piston valve assembly comprises only one non-return valve which opens during the compression stroke and closes during the tension stroke. With this embodiment, the shut-off valve assembly and its control chamber outlet cross-section dimensioning means alone determine the characteristic curve in the tension stroke and in the compression stroke. This first possibility can be modified in that the non-return valve of the piston valve assembly which opens during the compression stroke is throttled. It is then again valid that during the tension stroke the damping characteristic is determined solely by the shut-off valve assembly and its outlet cross-section dimensioning means while during the compression stroke the damping characteristic is additionally influenced by the throttling in the non-return valve of the piston valve assembly which opens during the compression stroke. It is upon this first possibly modified possibility that the following description of embodiments shown in FIGS. 2 to 10 is based.

A second possibility is this one:

The bottom valve assembly comprises a non-return valve which opens during the tension stroke and, parallel with this non-return valve, a damping valve which allows a throttle throughflow during the compression stroke. The piston valve assembly comprises a non-return valve with a throttling action which opens during the tension stroke and a non-return valve with or without a throttling action which opens during the compression stroke. With this second possibility, the damping effect during the tension stroke and during the compression stroke is determined not only by the shut-off valve assembly and its control chamber outlet cross-section dimensioning means but additionally by the piston valve assembly or the bottom valve assembly, regardless of whether the non-return valve of the piston valve assembly which opens during the compression stroke is throttled or not. The mode of operation entailing the hardest damping occurs when the shut-off valve assembly is locked so that only the valves of the bottom valve assembly and of the piston valve assembly are operative.

However, the invention can also be applied to what are referred to as single-tube vibration dampers in which the fluid chambers on both sides of the vibration damper, are connected to each other by the fluid connection containing the shut-off valve assembly. In this case, according to the construction of the shut-off valve assembly, it may be necessary for different directions of movement to provide different fluid connections between the two fluid chambers, each of which is constructed with a shut-off valve assembly devised in accordance with the invention. Also in the case of single-tube vibration dampers, the vibration damper piston may be equipped with damping valves which are in turn designed for the hardest damping mode, namely when the fluid connection containing the shut-off valve assembly is completely closed. It is also true for this embodiment that the softest damping occurs when the outlet cross-section of the control chamber is adjusted to the greatest dimension.

The proposal according to the invention is not in principle tied to one embodiment in which the fluid connection containing the shut-off valve assembly is mounted on the cylinder. In principle, it would also be conceivable for the fluid connection containing the shut-off valve assembly to be disposed inside the vibration damper piston or at the end of the cylinder.

Certainly, in accordance with a preferred form of embodiment, it is envisaged that the shut-off valve assembly should be mounted on the cylinder because with this embodiment the delivery of control signals for adjusting the outlet cross-section of the control chamber outlet is simplified.

The various features of novelty which characterise the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF PREFERRED EMBODIMENTS

Figure 1:
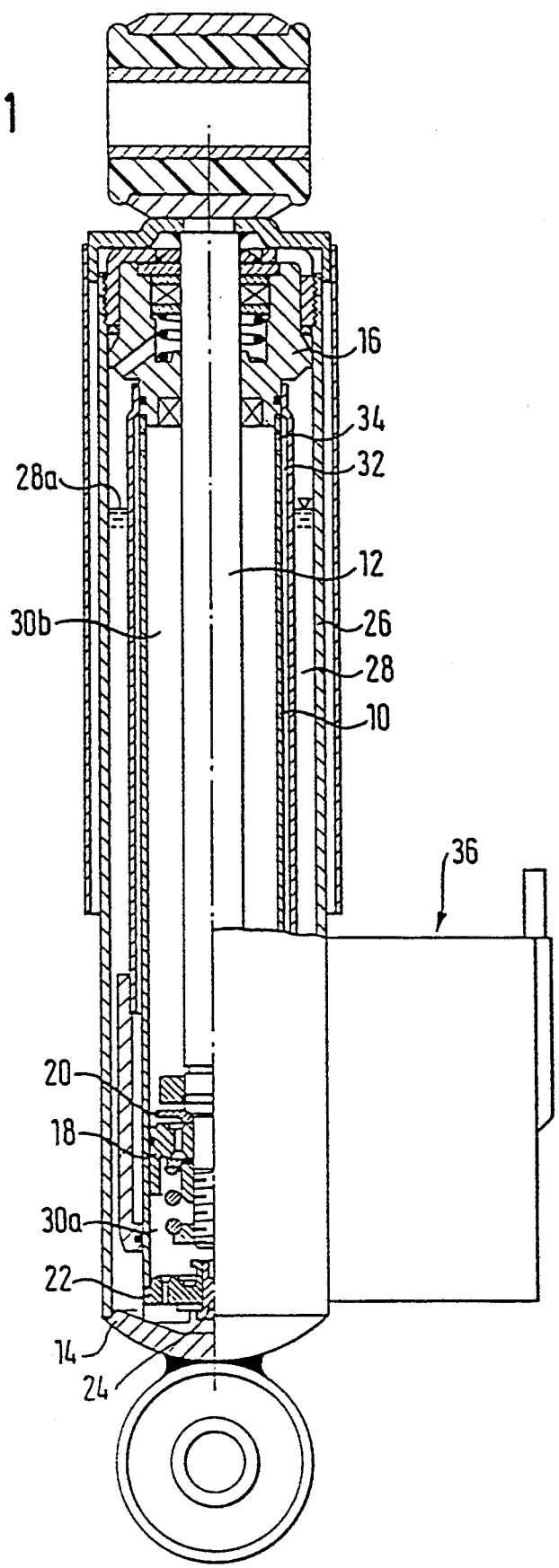
FIG. 1 shows a vibration damper with a by-pass and a shut-off valve assembly in the by-pass.

FIG. 1 shows the cylinder 10 of a twin-tube vibration damper while the piston rod is identified by reference numeral 12. At the bottom, the cylinder is closed by a bottom 14. The piston rod 12 extends out of the top end of the cylinder through a guide and packing unit 16. Inside the cylinder 10, on the piston rod 12, there is fixed a piston unit 18 with a piston valve arrangement 20. The bottom end of the cylinder is closed off by a bottom plate 22 with a bottom valve arrangement 24. The cylinder 10 is enclosed by a container tube 26. Between the container tube 26 and the cylinder 10 there is formed an annular space 28 which constitutes a compensating chamber. The space inside the cylinder 10 is sub-divided by the piston unit 18 into a first working chamber 30a and a second working chamber 30b. The working chambers 30a and 30b are filled with a damping fluid. The compensating chamber 28 is filled to the level 28a with fluid and above it with gas. Inside the compensating chamber 28 is a first section, namely a high pressure section 32 which communicates with the second working chamber 30b via a bore 34 in the cylinder. Adjacent this high pressure section 32 is a shut-off valve assembly 36 mounted on the side of the container tube 26. Extending from this (not shown in FIG. 1) is a second section, namely a low pressure section, which extends to the compensating chamber 28 and in fact within its fluid filled zone.

When the piston rod 12 moves upwardly out of the cylinder 10, the upper working chamber 30b is made smaller. There forms in the upper working chamber 30b an over-pressure which by virtue of the piston valve arrangement 20 can dissipate into the lower working chamber so long as the shut-off valve assembly 36 is closed (hard damping mode). If the shut-off valve assembly 36 is opened, then at the same time liquid flows from the upper working chamber 30b through the high pressure 32 and the shut-off valve assembly 36 into the compensating chamber 28 (soft damping mode). The damping characteristics of the vibration damper during extension of the piston rod 12 depend therefore upon whether the shut-off valve assembly 36 is opened or closed.

When the piston rod 12 retracts into the cylinder 10, an over-pressure forms in the lower working chamber 30a. Fluid can then pass upwards through the piston valve arrangement 20 into the upper working chamber 30b. The fluid displaced by the increasing piston rod volume inside the cylinder is expelled through the bottom valve arrangement 24 into the compensating chamber 28. Since the throughflow resistance of the piston valve arrangement 20 is less than the throughflow resistance of the bottom valve arrangement 24, an increasing pressure likewise occurs in the upper working chamber 30b. This rising pressure can, if the shut-off valve assembly 36 is open, flow through the high pressure section 32 into the compensating chamber 28. This means that if the shut-off valve assembly 36 is open the vibration damper even during retraction has a softer damping characteristic if the shut-off valve assembly 36 is open and a harder damping characteristic if the shut-off valve assembly 36 is closed, just as during extension of the piston rod. What is certain is that the direction of flow through the high pressure section 32 of the by-pass is always the same regardless of whether the piston rod is moving in or out.

Figure 2:
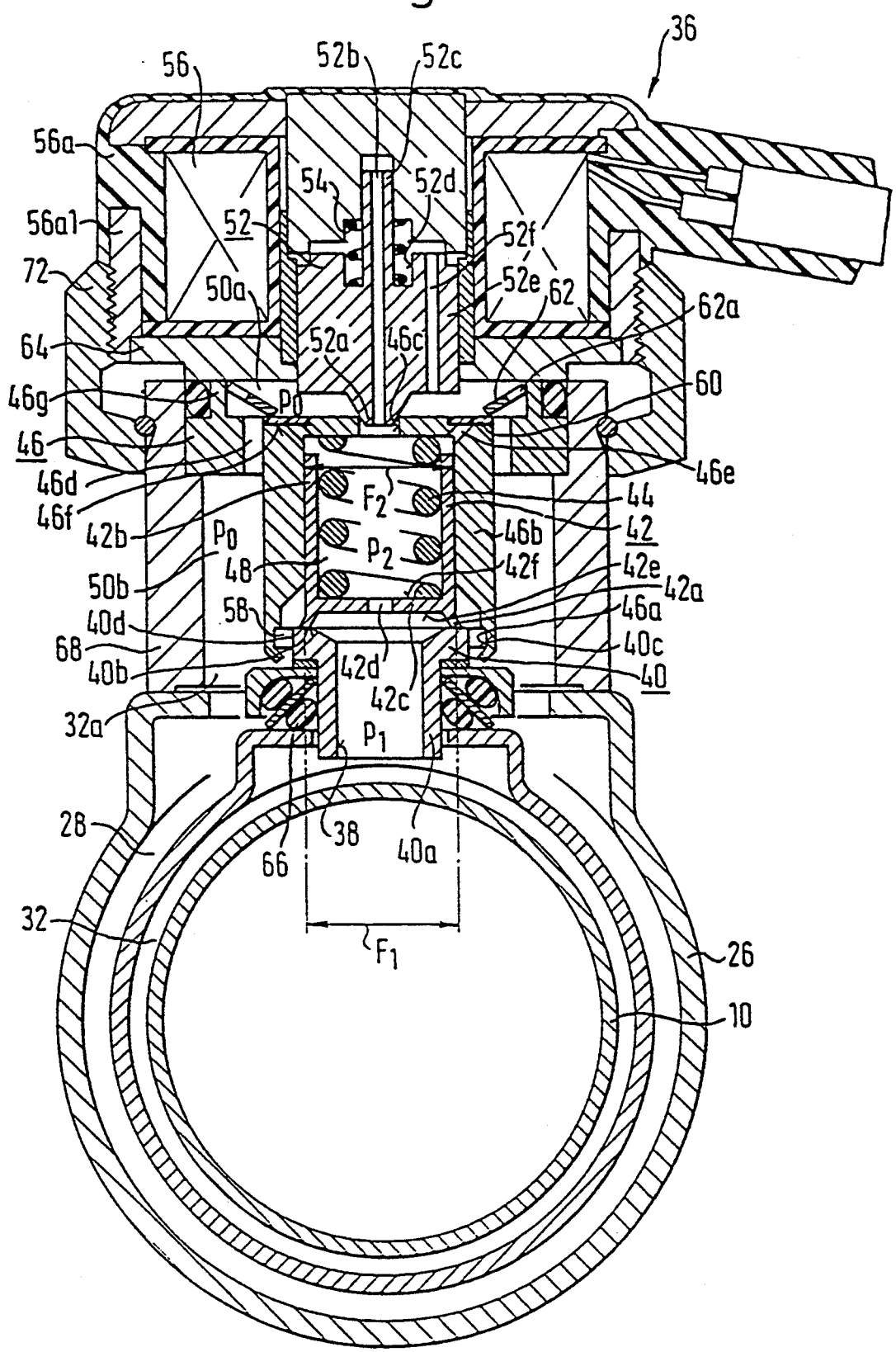
FIG. 2 shows a first preferred embodiment of the shut-off valve assembly of the vibration damper.

FIG. 2 shows a cross sectional view of a first embodiment of the shut-off valve assembly 36. As shown in FIG. 2, adjacent the high pressure section 32 is a central passage 38 of a valve seat body 40, the upper end of which (as viewed in FIG. 2) constitutes a valve seat 40b. Seated against the valve seat 40b is an annular flange 42a of a generally cylindrical valve shut-off element 42. The valve shut-off element 42 is biased towards the valve seat 40b by a coil spring 44, which is received within the shut-off element 42 and which acts against the intermediate member 46. The outer peripheral edge 40c of the valve seat member 40 is engaged in a crimped-over recess 46a in the side wall 46b of the intermediate member 46, so as to secure the intermediate member 46 to the valve seat member 40. When the shut-off valve element 42 is open, i.e., lifted off the valve seat 40b, damping fluid is able to flow therebetween and thence downwards towards the compensating chamber 28 through passages 58 defined by the side wall 46b of the intermediate member 46 and recesses 40d formed in the valve seat member 40.

The central passage 38 is connected by a throttle bore 42d in the bottom wall 42c of the valve shut-off element 42 to a control chamber 48 defined by the shut-off element side wall 42b and the surrounding intermediate member 46. The pressure $P_1$ prevailing in the central passage 38 acts on the surface area $F_1$ of the front face 42e of the bottom wall 42c of the valve shut-off element 42, and the pressure $P_2$ prevailing in the control chamber 48 acts on the surface area $F_2$ of the back face 42f of the bottom wall 42c. The surfaces $F_1$ and $F_2$ are of substantially the same size in the example of embodiment shown in FIG. 2.

So long as only the coiled thrust spring 44 is acting on the valve shut-off element 42, the shut-off valve 42, 40b acts as a spring loaded valve which opens under pressure and which during the upwards stroke of the piston rod 12 in FIG. 1 is in parallel with the piston valve arrangement 20 while during the downwards stroke of the piston rod 12 in FIG. 1 it is parallel with the bottom valve arrangement 24.

The opening cross-section of a control chamber outlet 46c constructed in the intermediate member 46 can be externally controlled by a magnetic armature 52. When the control chamber outlet 46c is opened, the throttle bore 42d, the control chamber 48, the control chamber outlet 46c, a chamber 50a constructed behind the intermediate member 46 in the direction of flow, bores 46d provided in the intermediate member and a passage 50b constitute a by-pass for damping fluid which extends parallel with the main flow path.

The magnetic armature 52 is initially tensioned by a magnetic armature pretensioning spring 54 in FIG. 2 downwardly in the direction of the control chamber outlet 46c so that the magnetic armature 52 closes the control chamber outlet 46c with a conical head part 52a when a magnetic winding 56 which acts upon the magnetic armature 52 is not charged with current. If the magnetic winding 56 is charged with current, the magnetic armature 52 is lifted against the force of the spring 54 and releases the control chamber outlet 46c. According to how much current is passing through the magnetic winding 56, so the magnetic armature 52 is adjustable to a plurality of positions so that the opening cross-section of the control chamber outlet 46c can assume a plurality of values.

Figure 12:
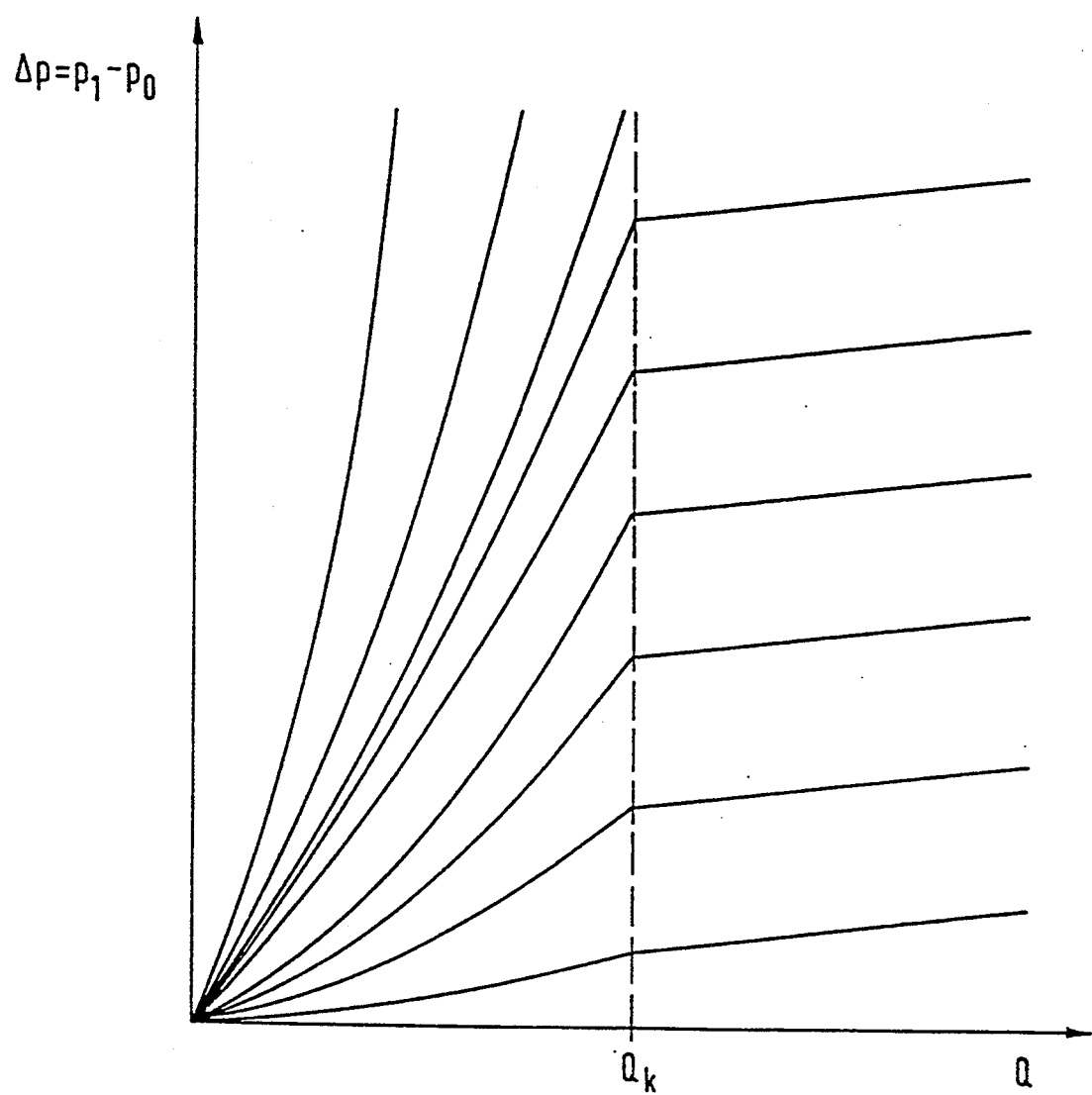
FIG. 12 shows a second characteristic curve which can be achieved using a vibration damper having a shut-off valve assembly according to a modified first preferred embodiment.

A bore 52b passes through the magnetic armature 52 from the tip of the conical head part 52a to a tubular projection 52c which is disposed on the back of the magnetic armature 52 which is at the top in FIG. 12. The tubular projection 52c has on its outer periphery the same diameter as the control chamber outlet bore 46c. The pressure $p_2$ prevailing in the control chamber 48 is thus applied to equal size surfaces on front and rear of the magnetic armature 52 and is thus unable to exert its force on the magnetic armature 52. The tubular projection 52c also serves as a guide for the magnetic armature pretensioning spring 54 which is to a certain extent accommodated in an annular groove 52d constructed on the back of the magnetic armature 52. A bore 52f passing through the body 52e of the magnetic armature 52 connects to the back of the magnetic armature 52 the front of the body 52e of the magnetic armature to which the pressure $p_0$ in the compensating chamber 28 is applied. Since the front and the back of the magnetic armature 52 have the same surface area, also the pressure $p_0$ is unable to exert any force on the magnetic armature 52.

Figure 11:
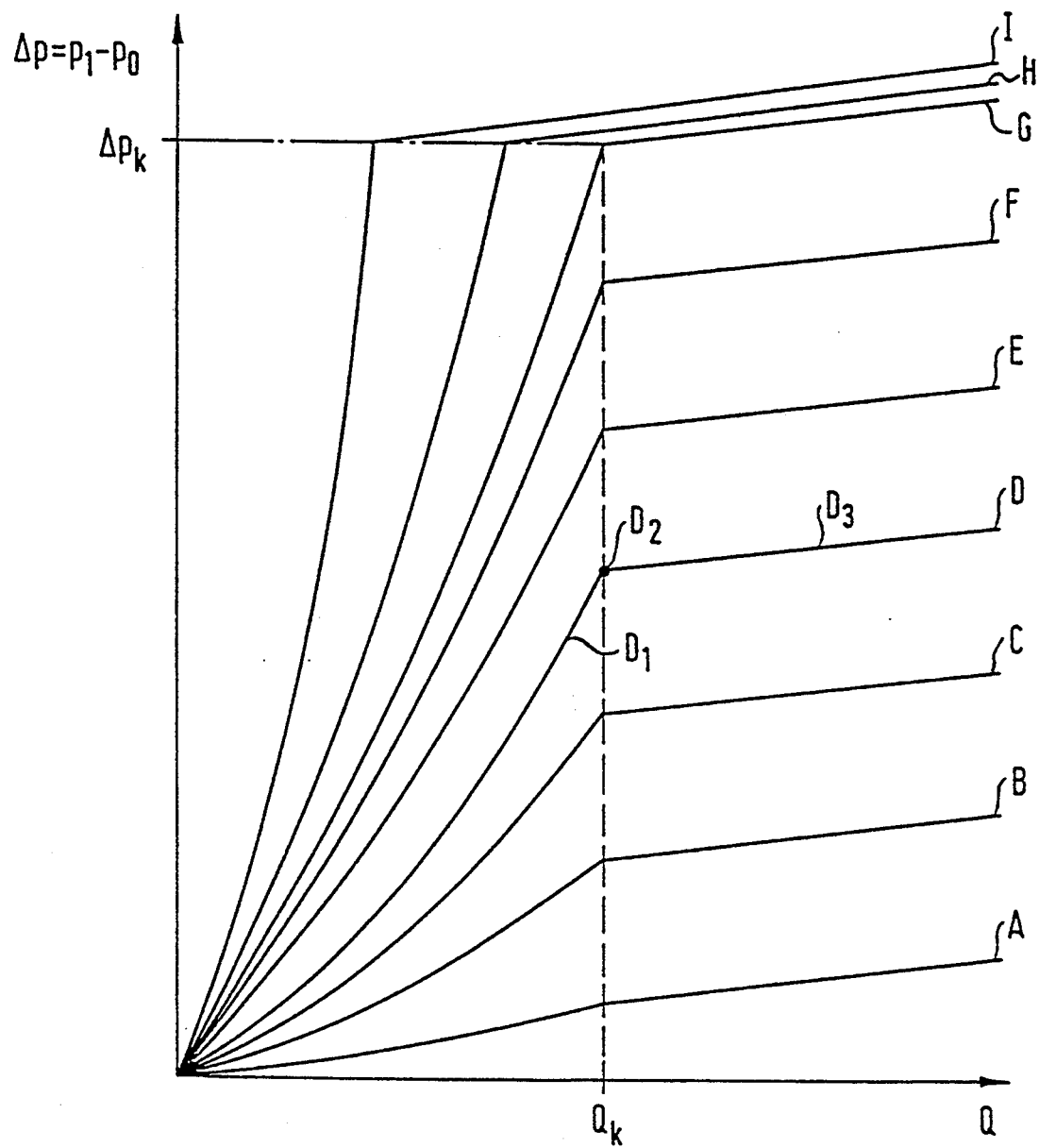
FIG. 11 shows a first characteristic curve which can be achieved using a vibration damper having a shut-off valve assembly according to the first and second preferred embodiments.

The pattern of the vibration damper characteristic curve according to FIGS. 2 and 11 will be explained in greater detail hereinafter. FIG. 11 shows on the ordinates the total pressure difference $\Delta p$ ($=p_1-p_0$) between the pressure $p_1$ prevailing in the high pressure section 32 and thus in the central passage 38 and the pressure $p_0$ prevailing in the compensating chamber 28 while there is on the abscissa the total throughflow rate Q (throughflow quantity per unit of time) of damping fluid through the shut-off valve assembly 36. The total throughflow rate Q is the sum of the throughflow rates of the damping fluid flowing through the main flow path (main throughflow rate) and the subsidiary flow path (subsidiary throughflow rate). The various characteristic curves shown in FIG. 11 correspond to various values of control chamber outlet cross-section, i.e. various settings of the magnetic armature 52.

Let it be assumed that the magnetic winding 56 in FIG. 2 does not have current passing through it so that under the action of the pretensioning spring 54 the magnetic armature 52 closes the control chamber outlet 46c. In this case, there is in the control chamber 48 the same pressure as there is in the central passage 38. Since the surfaces $F_1$ on the front 42e of the valve shut-off element and $F_2$ on the back 42f of the valve shut-off element 42 are of the same size, the valve shut-off element 42 is maintained on the valve seat 40b by the force of the spring 44. Except for leakage flows, therefore, the shut-off valve assembly 36 does not have damping fluid passing through it (Q=0 in FIG. 11).

When current of a specific intensity is applied to the magnetic winding 56, the magnetic armature 52 is lifted against the force of the spring 54 and assumes a position corresponding to the current strength. The cross-section of the consequently available control chamber outlet 46c is the greater the more current is passing through the magnetic winding 56.

Now, damping fluid is able to flow from the central passage 38 through the throttle bore 42d into the control chamber 48 and thence onwards through the control chamber outlet 46c to the compensating chamber 38. The subsidiary throughflow rate through the throttle section 42d and the control chamber outlet 46c produces a pressure drop from the pressure $p_1$ in the central passage 38 to the pressure $p_2$ in the control chamber 48 and a pressure drop from $p_2$ in the control chamber 48 to the pressure $p_0$ in the compensating chamber 28. If, now, the pressure $p_1$ in the central passage 38 and thus also the total pressure difference $p_1-p_2$ between central passage 38 and compensating chamber 28 rises, then also the subsidiary throughflow rate will increase. According to Bernoulli's law, a given throughflow rate through a throttle section of constant opening cross-section produces a pressure drop which increases in proportion to the square on the throughflow rate. Accordingly, both the pressure difference $p_1-p_2$ between the pressure $p_1$ prevailing in the central passage 38 and the pressure $p_2$ prevailing in the control chamber 48 and also the pressure difference $p_2-p_0$ between the pressure $p_2$ prevailing in the control chamber 48 and the pressure $p_0$ prevailing in the compensating chamber 28 increase with increasing subsidiary throughflow rate Q according to a parabola, so that a parabolic pattern emerges also for the total pressure difference $p_1-p_0$. (For example, portion $D_1$ of the trace in FIG. 11).

If the subsidiary flow rate reaches a value $Q_k$, then the hydraulic force acting on the surface area $F_1$ on the front face 42e of the valve shut-off element 42 as a result of the pressure $p_1$ in the central passage 38 is of the same magnitude as the sum of the hydraulic force which by virtue of the pressure $p_2$ in the control chamber 48 acts on the surface area $F_2$ on the back 42f of the valve shut-off element 42 and the force of the spring 44 (for example point $D_2$ in FIG. 11).

If the subsidiary throughflow rate exceeds the value $Q_k$, then the hydraulic force acting on the front 42e of the valve shut-off element 42 is greater and the valve shut-off element 42 is lifted off the valve seat 40b. Damping fluid is now able to pass through the main flow path into the compensating chamber 28. In addition, however, there is still a certain secondary flow through the throttle section 42d and the control chamber outlet 46c. Since the total throughflow rate Q however is now dominated by the spring loaded valve 42, 40b, the total pressure difference $p_1-p_0$ between the pressure $p_1$ and the central passage 38 and the pressure $p_0$ in the compensating chamber 28 varies substantially in a direct proportion to the total throughflow rate Q (for example trace portion $D_3$ in FIG. 11).

The greater the cross-section of the control chamber outlet 46c the greater is also the subsidiary throughflow rate which, for a given pressure difference $p_1-p_0$ is determined by the throttle section 42d and the control chamber outlet 46c. Consequently, the parabolic first portion of the damper characteristic curve determined by the throttled secondary flow is the shallower the greater is the control chamber outlet cross-section 46c (see curves C, B and A in FIG. 11). However, as previously explained, since it is only the pressure difference $p_1-p_2$ but not the absolute value of the pressures $p_1$ and $p_2$ which are required to lift the valve shut-off element 42 off the valve seat 40b, and as this pressure difference $p_1-p_2$ depends only upon the secondary throughflow rate, the main flow valve 42, 40b opens regardless of the control chamber outlet cross-section 46c always at the same throughflow rate $Q_k$ as is indicated in FIG. 11 by the broken line extending parallel with the pressure axis. The greater is the opening cross-section of the control chamber outlet 46c, i.e. the flatter is the path followed by the vibration damper characteristic curve, the softer and more comfortable is the damping characteristic of the vibration damper.

The flow of current through the magnetic winding 56 may be controlled for example as a function of the running conditions of the vehicle so that in any running situation it is possible to guarantee an optimum compromise between travelling comfort and travelling safety. For example, the feed current for the magnetic winding 56 can be predetermined by a processor which can be controlled by one or a plurality of sensors, for example a vehicle acceleration sensor, pitch angle sensor and roll angle sensor.

Furthermore, it is also conceivable for the current intensity through the magnetic winding 56 to be arbitrarily influenced by the vehicle manufacturer or by the vehicle user in order to select a more or less comfortable or alternatively more sporty type of operation.

In relation to FIG. 11, A denotes an extremely comfortable characteristic curve while G, H and I represent graphs showing a sporty performance.

The pot-shaped intermediate member 46 in FIG. 2 comprises bores 46e which are closed by an annular disc-shaped valve body 60. The annular disc 60 is accommodated in an annular groove 46f in the intermediate member 46. A plate spring 62 provided with recesses 62a pretensions the annular disc 60 in the recesses 46f. In an axial direction, the plate spring 62 is supported on a plate 64 while in a radial direction it is supported on an annular flange 46g constructed on the intermediate member 46. The bores 46e, the annular disc 60 and the plate spring 62 form a pressure relief valve which limits the maximum pressure in the control chamber 48. If the pressure in the control chamber 48 reaches this limit value before the main valve 42, 40b has opened, the pressure relief valve 60, 46e opens and forms an additional possibility for the discharge of damping fluid from the control chamber 48. The outlet bores 46e are so dimensioned that the pressure $p_2$ in the control chamber 48 collapses sufficiently for the main valve 42, 40b to open. With a steeply extending parabolic first trace portion (curves G, H and I in FIG. 11), the main valve 42, 40b does not therefore open as a function of the throughflow rate but as a function of the pressure, as indicated by the dash-dotted line extending parallel with the throughflow rate axis in FIG. 11.

If the control chamber 48 of the shut-off valve assembly does not have a pressure relief valve, the result is the batch of characteristic curves shown in FIG. 12.

If the main flow valve 42, 40b in FIG. 2 is to be closed again, then for this purpose it is necessary only to shut off the current through the magnetic winding 56. The magnetic armature 52 then closes the control chamber outlet 46c due to the force of the spring 54. Therefore, no more damping fluid is able to pass out of the control chamber 48 into the compensating chamber 28. Consequently, the same pressure builds up again in the control chamber 48 as also prevails in the central passage 38 and the valve shut-off element 42 is forced back again onto the valve seat 40b by the force of the spring 44.

The valve seat body 40 is tightly applied to the first section 32 of the by-pass by a seal 66. The valve seat body 40 and the intermediate member 46 are inserted into a tubular socket 68 which is welded to the container 26. The passage 50b disposed between the tubular connector 68 and the side wall 46b of the intermediate member 46 forms a second section 32a of the by-pass. The sections 32 and 32a together form the by-pass.

Together with the iron parts and housing parts which are part of the magnetic winding 56, the plate 64 can form one structural unit. It is also possible for all parts of the shut-off valve assembly 36 to be mounted one after on the tubular connector 68 and finally for this tubular connector 68 to be connected by a cap nut 72 to the magnetic winding housing 56a or to a screwthreaded insert 56a1 of the magnetic winding housing 56a.

When the magnetic armature 52 is attracted, the throttle bore 42d and the control chamber outlet 46c do not serve simply as a pre-opening for the pressure dependent main flow valve 42, 40b, but constitute a subsidiary flow path for damping fluid extending parallel with the main flow path. The bores 42d and 46c are of large dimensions so that when the magnetic armature 52 is completely retracted, i.e. at the maximum opening cross-section of the control chamber outlet 46c, the valve shut-off element 42 only starts to lift off the valve seat 40b when the subsidiary throughflow rate through the control chamber outlet 46c is at least 0.2 times the total throughflow rate, i.e. the sum of main throughflow rate and subsidiary throughflow rate through the shut-off valve assembly 36 which is adjusted at a damping velocity of 1 m/sec. If both the maximum opening cross-section of the control chamber outlet 46c and also the cross-section of the throttling section 42d amount to at least 1/150th of the fluid displacement cross-section of the vibration damper, i.e. of the cross-section of the piston 18 in the compression stage, then it is assured that lift off of the valve shut-off element 42 takes place at the maximum opening cross-section of the control chamber outlet 46c at low pressures, i.e. in the case of motor car shock absorbers, for instance below 15 bars.

Figure 3:
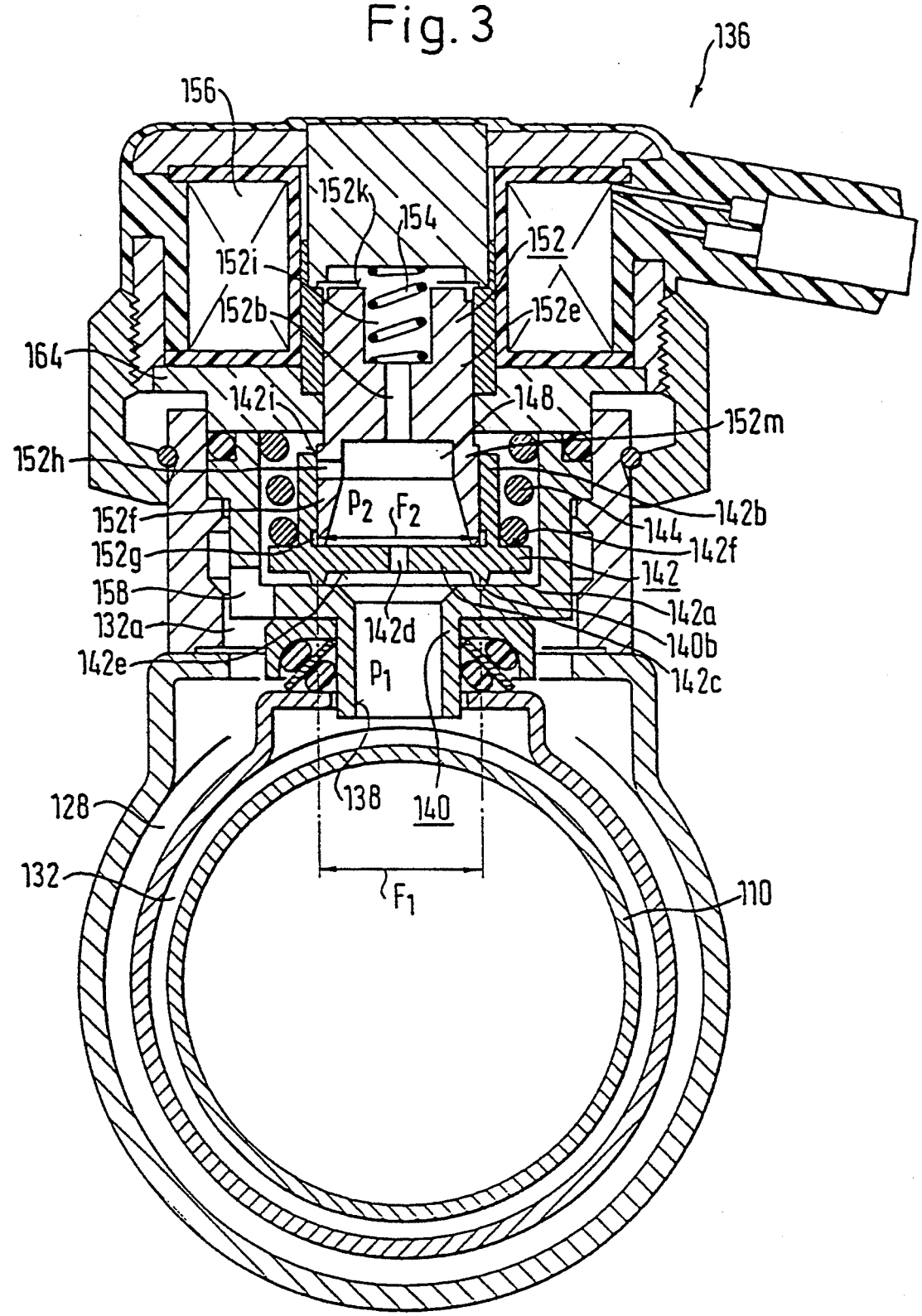
FIG. 3 shows a second preferred embodiment of the shut-off valve assembly of the vibration damper.

FIG. 3 shows a second example of embodiment of a shut-off valve assembly with which it is possible to achieve vibration damper characteristic curves as shown in FIG. 11. In its construction and function, this embodiment corresponds substantially to that shown in FIG. 2. Therefore, the second example of embodiment will only be described in detail hereinafter in so far as it differs from the example of embodiment shown in FIG. 2, similar parts being identified by the same reference numerals as in FIG. 2 but increased by 100.

In the example of embodiment according to FIG. 3, the control chamber outlet valve consists of a gate valve. The bottom part 142c of the pot-shaped valve shut-off element 142 has a larger outside diameter than the tubular side wall 142b. A coiled thrust spring 144 has one end biased on the projecting portion of the bottom part 142c and tensions the valve shut-off element 142 with an annular flange 142a against the valve seat 140b. The magnetic armature 152 is constructed with a tubular projection 152f which is guided in the tubular side wall 142b of the valve shut-off element 142. The extension 152f is provided with, extending in an axial direction, projections 152g by which the extension 152f is seated on the valve shut-off element 142 when the magnetic winding 156 which acts upon the magnetic armature 152 is not charged with current. The space bounded by the magnetic armature 152 and the valve shut-off element 142 forms the control chamber 148. The central passage 138 is connected to the control chamber 148 via a throttle bore 142d. The projection 152f has radial bores 152h which form a control chamber outlet and which are completely covered by the tubular side wall 142b of the valve shut-off element 142 when the projections 152 g of the magnetic armature 152 are seated on the valve shut-off element 142. If the magnetic winding 156 is charged with current and the magnetic armature 152 is raised against the force of the spring 154, then the cross-section of the bores 152h is to a certain extent exposed by a control edge 142i. The size of the cross-section is determined by the current intensity of the winding current. Damping fluid expelled through the control chamber outlet 152h can continue to flow to the compensating chamber 128 through passages 158 constructed in the pot-shaped valve seat member 140.

In this example of embodiment, the function of a pressure relief valve is likewise fulfilled by the magnetic armature. The pressure $p_2$ prevailing in the control chamber 148 is passed on through a bore 152b and a spring chamber 152i accommodating the magnetic armature pretensioning spring 154 to the back 152k. The tubular projection 152m has a larger outside diameter than the body 152e of the magnetic armature 152. The end face of the magnetic armature 152 which is towards the control chamber 148 therefore offers the pressure $p_2$ a greater area on which to act than the rear face 152k. The result is a force directed towards an opening of the control chamber outlet 142i, 152h. If the pressure $p_2$ in the control chamber 148 exceeds a predetermined value, then the hydraulic force exerted by the pressure $p_2$ on the magnetic armature 152 is greater than the force of the magnetic armature pretensioning spring 154. Consequently the magnetic armature 152 releases the control chamber outlet 142$i$, 152$h$ without the magnetic winding 156 first being charged with current.

Also in this example of embodiment, the surfaces $F_1$ and $F_2$ of the valve shut-off element 142 are of the same size so that similar vibration damper characteristic curves result as are shown in FIG. 11.

Figure 4:
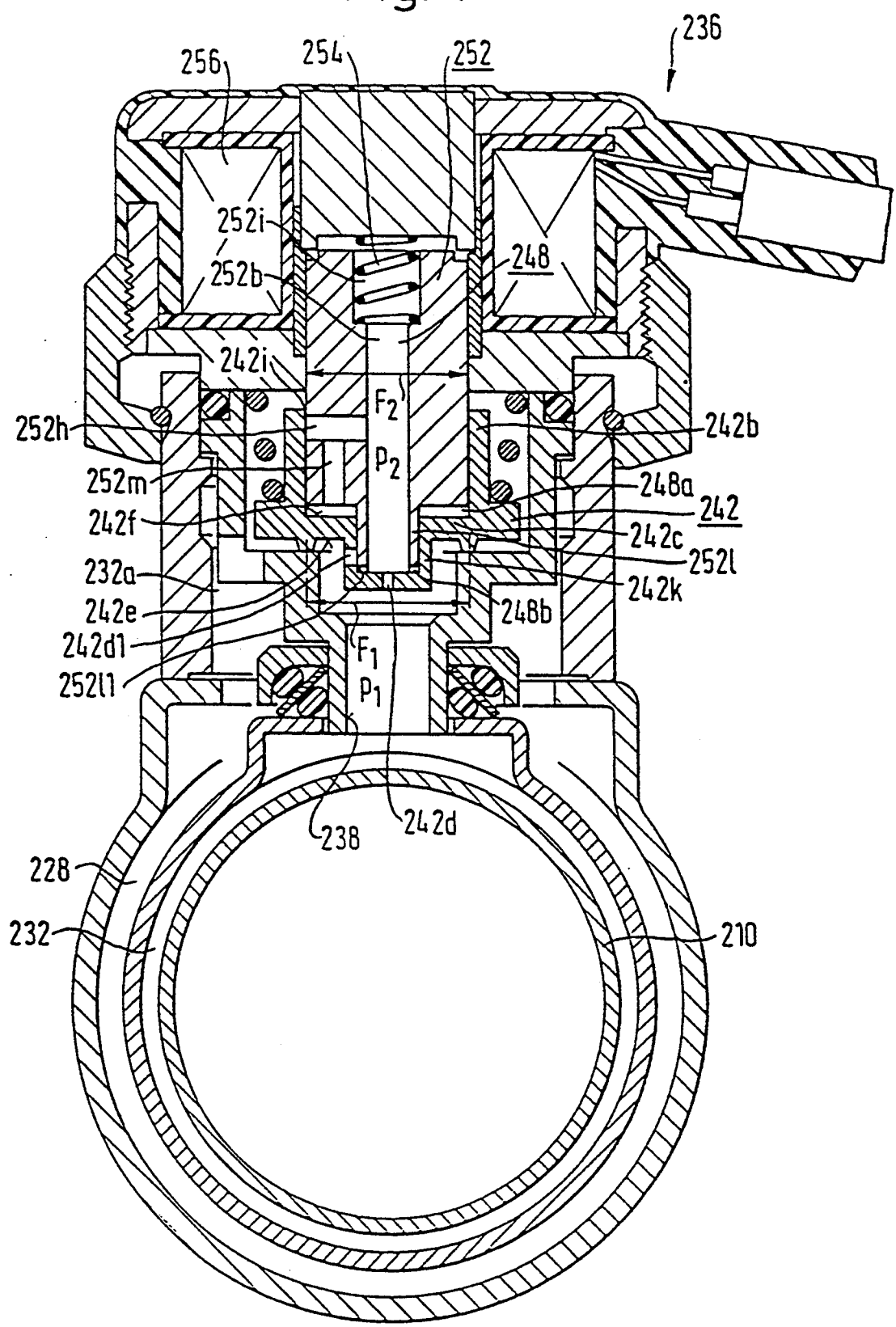
FIG. 4 shows a third preferred embodiment of the shut-off valve assembly of the vibration damper.

FIG. 4 shows a further embodiment of a shut-off valve assembly which in its construction and function corresponds substantially to the examples of embodiment shown in FIGS. 2 and 3. Hereinafter, therefore, this example of embodiment is only described in so far as it differs from the previously described examples, at similar parts being provided with the same reference numerals as in FIG. 2 but increased by 200.

In this example of embodiment, the valve shut-off element 242 is likewise pot-shaped, the bottom 242$c$ of the pot being constructed with a pot-shaped extension 242$k$. The magnetic armature 252 is guided in the tubular side wall 242$b$ of the valve shut-off element 242 and has in turn a tubular extension piece 252$l$ which engages the extension piece 242$k$. A bore 252$b$ extends from the tubular extension 252$l$ to a spring chamber 252$i$ situated at the back of the magnetic armature and in which the magnetic armature pretensioning spring 254 is accommodated. Branching off the bore 252$b$ are radial bores 252$h$. From these radial bores 252$h$, there emerge bores 252$m$ which open out into an annular space 248$a$. A space 248$b$ constructed between the tubular projection 252$l$ of the magnetic armature 252 and the pot-shaped extension piece 242$k$ of the valve shut-off element 242, the bores 252$b$, 252$h$ and 252$m$, the annular space 248$a$, the spring chamber 252$i$ and the space above the magnetic armature 252 form the control chamber 248.

Also in this example of embodiment, the radial bores 252$h$ and the control edge 242$i$ constitute the variable cross-section control chamber outlet. The central passage 238 communicates with the control chamber 248 on the one hand through a throttle bore 242$d$ of constant opening cross-section and on the other via a throttle bore 242$d$1 which is occluded by the tubular extension 252$l$ of the magnetic armature 252 when the magnetic winding 256 is not charged with current. However, if the magnetic armature 252 is retracted by the magnetic force of the winding 256, then the bore 242$d$1 and the control edge 252$l$1 of the tubular projection 252$l$ of the magnetic armature 252 will constitute a throttling section of variable cross-section which is situated in parallel with the throttle section 242$d$ of constant opening cross-section. It should be established that the cross-section of the throttling section 242$d$1 behaves as a function of the position of the magnetic armature 252 in exactly the same way as the cross-section of the control chamber outlet 252$h$; both cross-sections become larger the farther the magnetic armature 252 is retracted by the magnetic force of the winding 256. Since the bores 252$h$ are of greater diameter than the throttle bore 242$d$1, the cross-section of the control chamber outlet 252$h$ increases more intensely during lifting of the magnetic armature than does the total cross-section of the throttling sections 242$d$ and 242$d$1.

Figure 13:
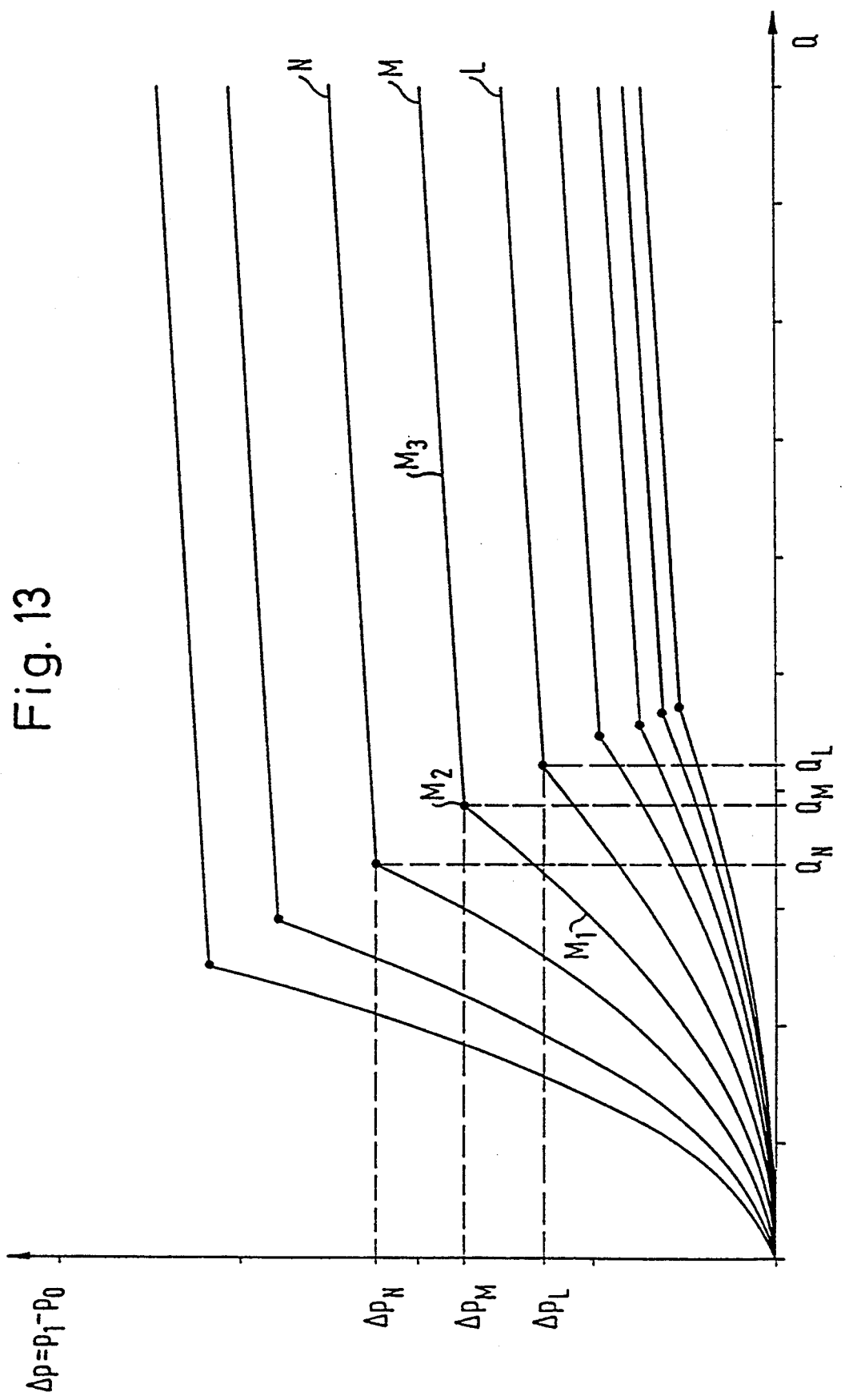
FIG. 13 shows a third characteristic curve which can be achieved using a vibration damper having a shut-off valve assembly according to the third through ninth preferred embodiments.

It is intended now with reference to FIGS. 4 and 13 to explain the effects of such a variable throttle section cross-section on the vibration damper characteristics. For a given current strength through the magnetic winding 256, the throttling sections 242$d$ and 242$d$1 together have a specific cross-section which together with the cross-section of the control chamber outlet 252$h$ determines the subsidiary rate of flow of damping fluid. The damper characteristic, for example the characteristic curve M in FIG. 13, is for the reasons explained in connection with the characteristic curve field in FIG. 11, sub-divided into a parabolically extending first portion $M_1$ passing through the throttling sections 242$d$ and 242$d$1 and a substantially linear second portion $M_3$ determined by the spring loaded valve 242, 240$b$. The two characteristic curve portions $M_1$ and $M_3$ merge into each other at the bend $M_2$.

If the magnetic armature 252 is retracted further somewhat, then not only is the cross-section of the control chamber outlet 252$h$ increased but also the total cross-section of the throttling sections 242$d$ and 242$d$1. The subsidiary throughflow rate therefore rises and the damper characteristics extend correspondingly flatter (see for example curve L in FIG. 13). Since the surface $F_1$ on the front 242$e$ of the valve shut-off element 242 which is subject to the pressure $p_1$ in the central passage 238 is in turn substantially of the same size as the surface area $F_2$ of the valve shut-off element 242 which is on the back 242$f$ and which is subject to the pressure $p_2$ in the control chamber 240, the resulting total hydraulic force on the valve shut-off element 242 depends only upon the pressure difference $p_1 - p_2$ and not upon the absolute value of the pressures $p_1$ and $p_2$. The pressure difference $p_1 - p_2$ needed to open the main flow valve is in the case of a larger throttle cross-section only reached at a higher rate of secondary throughflow, for example $Q_L$. Since the cross-section of the control chamber outlet 252$h$ increases more sharply than the total cross-section of the throttle sections 242$d$ and 242$d$1, the secondary throughflow rate is limited mainly by the total cross-section of the throttle sections 242$d$ and 242$d$1 and the total pressure difference $p_1 - p_0$ between the pressure $p_1$ prevailing in the central passage 238 and the pressure $p_0$ prevailing in the compensating chamber 228 falls mainly on the throttle sections 242$d$ and 242$d$1. Thus, the total pressure difference $p_1 - p_0$ at which the pressure difference $p_1 - p_2$ needed to open the main flow valve is reached drops more the greater is the attraction on the magnetic armature 252. All in all, therefore, the transition point shifts from the parabolically extending first portion of the characteristic curve to the linearly extending second portion of the characteristic curve, towards lower pressure differences (i.e. from $\Delta p_L$ to $\Delta p_N$) and higher rates of throughflow (i.e. from $Q_L$ to $Q_N$).

The group of characteristic curves shown in FIG. 13 corresponds to those which may also be obtained for instance when a vibration is attuned by experience to correspond to the relevant travelling situation and if the resultant characteristic curves are plotted on a common diagram. Therefore, the series of characteristic curves shown in FIG. 13 therefore provides an optimum answer to the demand for characteristic curves which do justice to the vibration damper.

Figure 5:
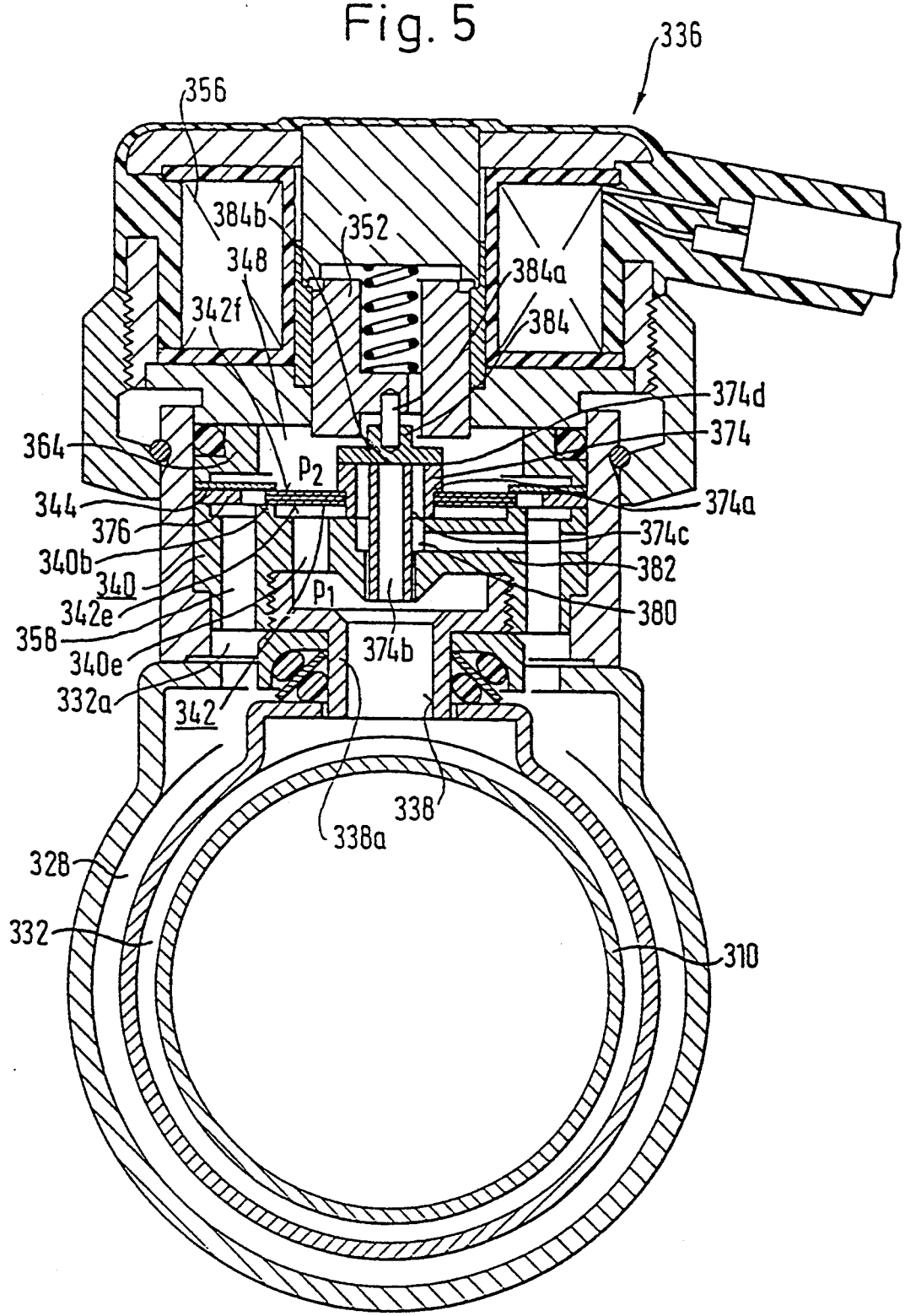
FIG. 5 shows a fourth preferred embodiment of the shut-off valve assembly of the vibration damper.

FIG. 5 shows a further example of embodiment of a shut-off valve assembly. Hereinafter, this example of embodiment will only be described in so far as it difference from the previously described examples of embodiment, similar parts being identified by the same reference numerals as in FIG. 2 but increased by 300.

In the example of embodiment shown in FIG. 5, the valve seat body 340 is disposed on a tubular part 338$a$ bounding the central passage 338. The pressure $p_1$ prevailing in the central passage 338 is passed via feed bores 340e to the front 342e of the valve shut-off element 342. The valve shut-off element 342 is formed by a stack of plate springs which are initially tensioned by a further plate spring 344 against the valve seat 340b. The inner peripheral edge of the plate springs 342 is applied by the pressure $p_1$ against a shoulder 374a constructed on a throughflow member 374 and is braced thereon. On its reverse side 342f, the valve shut-off element 342 is exposed to the pressure $p_2$ prevailing in the control chamber 348. Reverse face 342f and front face 342e have substantially the same working areas. The plate spring 344 has its outer peripheral edge clamped between a bracing member 364 and an annular disc-shaped intermediate member 376 which rests on the valve seat member 340. When the valve shut-off element 342 is lifted off the valve seat 340b, the damping fluid can continue to flow through ports 358 to the compensating chamber 328.

A central bore 374b in the throughflow member 374 ends in the same plane 374d as a ring of radially outer bores 374c in the throughflow member 374. The bores 374c end in an annular space 380 constructed in the valve seat member 340 and form a control chamber outlet together with this and with the radial bores 382 which end in the passages 358. The central bore 374b forms a control chamber feed means. The control chamber feed means 374b and the control chamber outlet can together be closed by a valve body 384 which is connected to the magnetic armature 352 via a connecting part 384a. Provided in the valve body 384 is a throttle bore 384b so that a connection of constant opening cross-section is provided between the central passage 338 and the control chamber 348.

Thus, in the case of the example of embodiment shown in FIG. 5, as with the example shown in FIG. 4, the cross-sections of control chamber feed means and control chamber outlet are simultaneously enlarged or simultaneously reduced in size according to the position of the magnetic armature 352. Since the bores 374c together have a greater cross-sectional area than the bore 374b in the throughflow member 374, then it is ensured also with this embodiment that according to FIG. 13 the points of connection of the parabolically extending first characteristic curve portions to the linearly extending second characteristic curve portions do with increasing control chamber outlet and control chamber supply means cross-sections shift towards higher total throughflow rates Q and lower pressure differences $p_1-p_0$.

Figure 6:
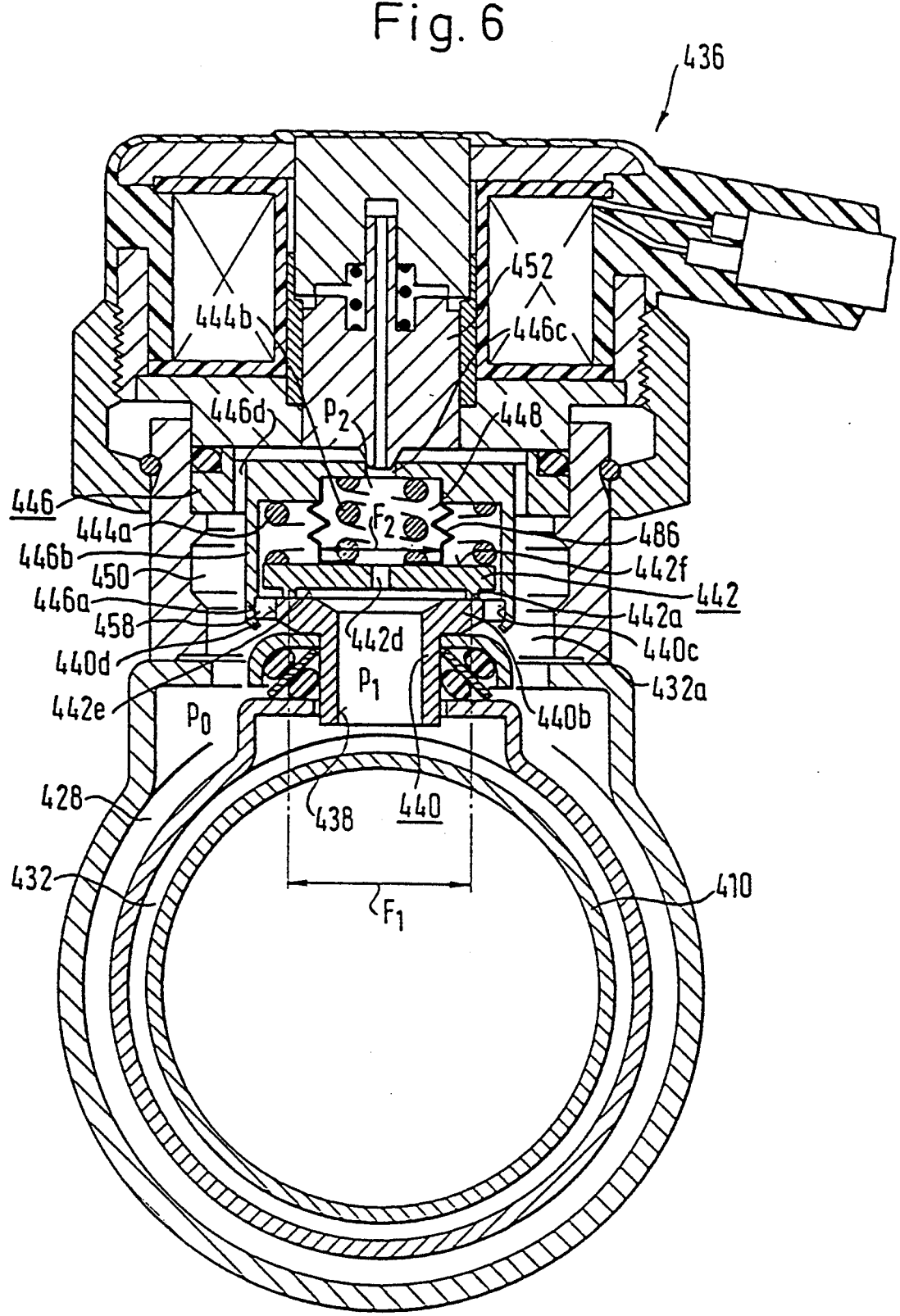
FIG. 6 shows a fifth preferred embodiment of the shut-off valve assembly of the vibration damper.

A further example of a shut-off valve assembly is shown in FIG. 6. Hereinafter, this example of embodiment will only be described in so far as it differs from the previously described example of embodiment, similar parts being identified by the same reference numerals as in FIG. 2 but increased by 400.

In the shut-off valve assembly 436, the valve shut-off element 442 has an annular flange 442a by which it rests on the valve seat member 440 being pretensioned against the valve seat 440b by two thrust springs 444a and 444b. On the front 442e of the valve shut-off element 442, an area $F_1$ is subject to the pressure $p_1$ prevailing in the central passage 438. The outer peripheral edge 440c of the valve seat member 440 engages recesses 446a which are provided in the side wall 446b of the intermediate member 446, which is therefore held.

The central passage 438 is connected to a control chamber 448 via a throttle bore 442d in the valve shut-off element 442. This control chamber 448 is disposed between the valve shut-off element 442 and the intermediate member 446 and is bounded by a pressure-resistantly constructed metal bellows 486 which is fixed at one end on the back 442f of the valve shut-off element 442 and at the other on the intermediate member 446. The valve shut-off element 442 offers the pressure $p_2$ prevailing in the control chamber a reverse side 442f having a working surface $F_2$. The surface area $F_2$ in the case of the example shown in FIG. 6 is smaller than the area $F_1$ which is subject to the pressure $p_2$ in the central passage 438. Furthermore, the valve shut-off element 442 has applied to its back 442f the pressure $p_0$ prevailing in the compensating chamber 428. The resulting hydraulic force on the valve shut-off element 442 can however be disregarded during further discussions, compared with the force exerted by the pressure $p_2$ on the valve shut-off element 442.

With the shut-off valve 442, 440b between the valve shut-off element 442 and the valve seat 440b open, the main flow path extends through passages 458 established by the side wall 446a of the intermediate member 446 and recesses 440d in the valve seat member 440, leading to the compensating chamber 428. The secondary flow path leads from the central passage 438 through the throttle bore 442d into the control chamber 448 and on through the control chamber outlet bore 446c which can be shut off by the magnetic armature 452 and behind the back of the intermediate member 446, through bores 446d provided in the intermediate member 446 and through the passage 450 to the compensating chamber 428.

The pattern of the vibration damper characteristic curves in the case of the example of embodiment shown in FIG. 6 will be explained hereinafter with reference to FIGS. 6 and 13, with the valve shut-off element 442 having different sizes of surface areas $F_1$ and $F_2$ to which pressure can be applied.

Since the surface $F_1$ which is subject to the pressure $p_1$ in the central passage 438 and the surface $F_2$ which is subject to the pressure $p_2$ in the control chamber 448 are not of the same size, the hydraulic force acting on the valve shut-off element 442 is no longer dependent solely upon the pressure difference $p_1-p_2$ but also on the absolute value of the pressure $p_1$. Since the area $F_1$ is greater than the area $F_2$, the pressure $p_1$ exerts on the differential surface area $F_1-F_2$ a force in the direction of the aperture of the main flow valve 442, 440b and on the valve shut-off element 442. During one damper stroke, the pressure $p_1$ prevailing in the central passage 438 varies far more than the pressure $p_0$ prevailing in the compensating chamber 428. Therefore, a variation in the total pressure difference $p_1-p_0$ can be attributed mainly to a variation in the pressure $p_1$. On the aforementioned grounds, therefore, the valve shut-off element 442 of the example of embodiment shown in FIG. 6 starts to lift off the valve seat 440b at increasingly lower throughflow rates Q the greater is the total pressure difference $p_1-p_2$ (see FIG. 13).

In other words: with diminishing cross-section of the control chamber outlet 446c (corresponding to the transition from the line L to the line M in FIG. 13), the bend point of the relevant characteristic curve shifts towards lower values of the throughflow rate Q and to greater pressure differences $p_1-p_0$.

Therefore, also by different dimensioning of the surfaces on the valve shut-off element to which pressure is applied, it is possible to achieve equally optimum characteristic curves which are appropriate to a vibration damper as were achieved in the examples of embodiment shown in FIGS. 4 and 5 by controlling the cross-sections of control chamber outlet and control chamber intake. It must be clearly stated that such a range of characteristic curves can also be achieved by combining variously sized surfaces $F_1$ and $F_2$ with controlled control chamber feed and control chamber outlet.

Figure 7:
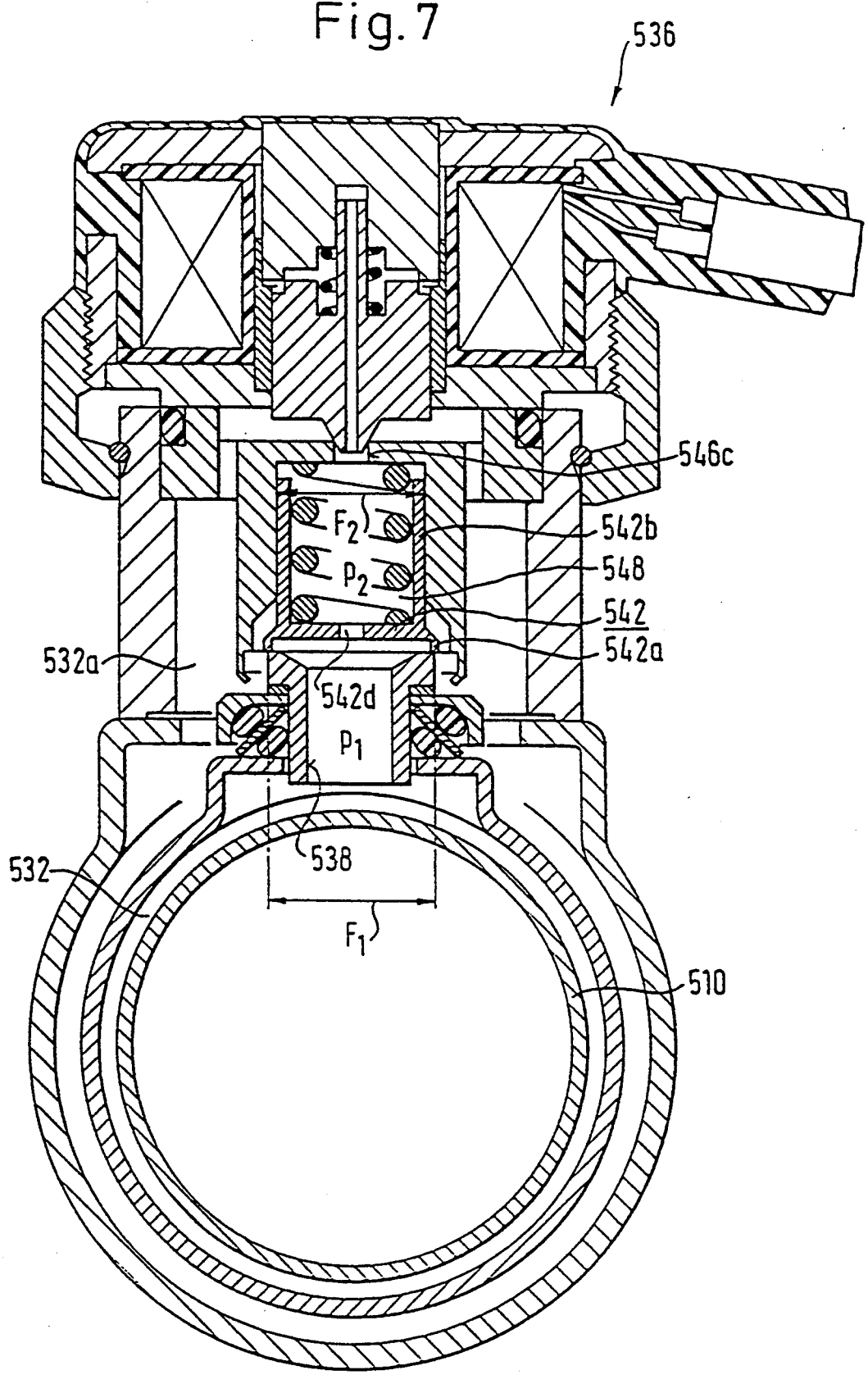
FIG. 7 shows a sixth preferred embodiment of the shut-off valve assembly of the vibration damper.

FIG. 7 shows a further embodiment of shut-off valve assembly. This embodiment will only be described hereinafter in so far as it differs from the aforedescribed examples, similar parts being identified by the same reference numerals as in FIG. 2 but increased by 500.

The embodiment shown in FIG. 7 corresponds substantially to the embodiment shown in FIG. 2. Only the annular flange 542a of the valve shut-off element 542 has a larger diameter than the annular flange 42a of the valve shut-off element 42 in FIG. 2. Furthermore, the diameter of the annular flange 542a is also larger than the outside diameter of the tubular extension piece 542b so that also in the case of the embodiment shown in FIG. 7 the surface area $F_1$ of the valve shut-off element 542 to which the pressure $p_1$ in the central passage 538 is applied is larger than the surface area $F_2$ to which the pressure $p_2$ in the control chamber 548 is applied and a range of characteristic curves extending as shown in FIG. 13 is obtained for the same reasons as were described in connection with FIG. 6.

Figure 8:
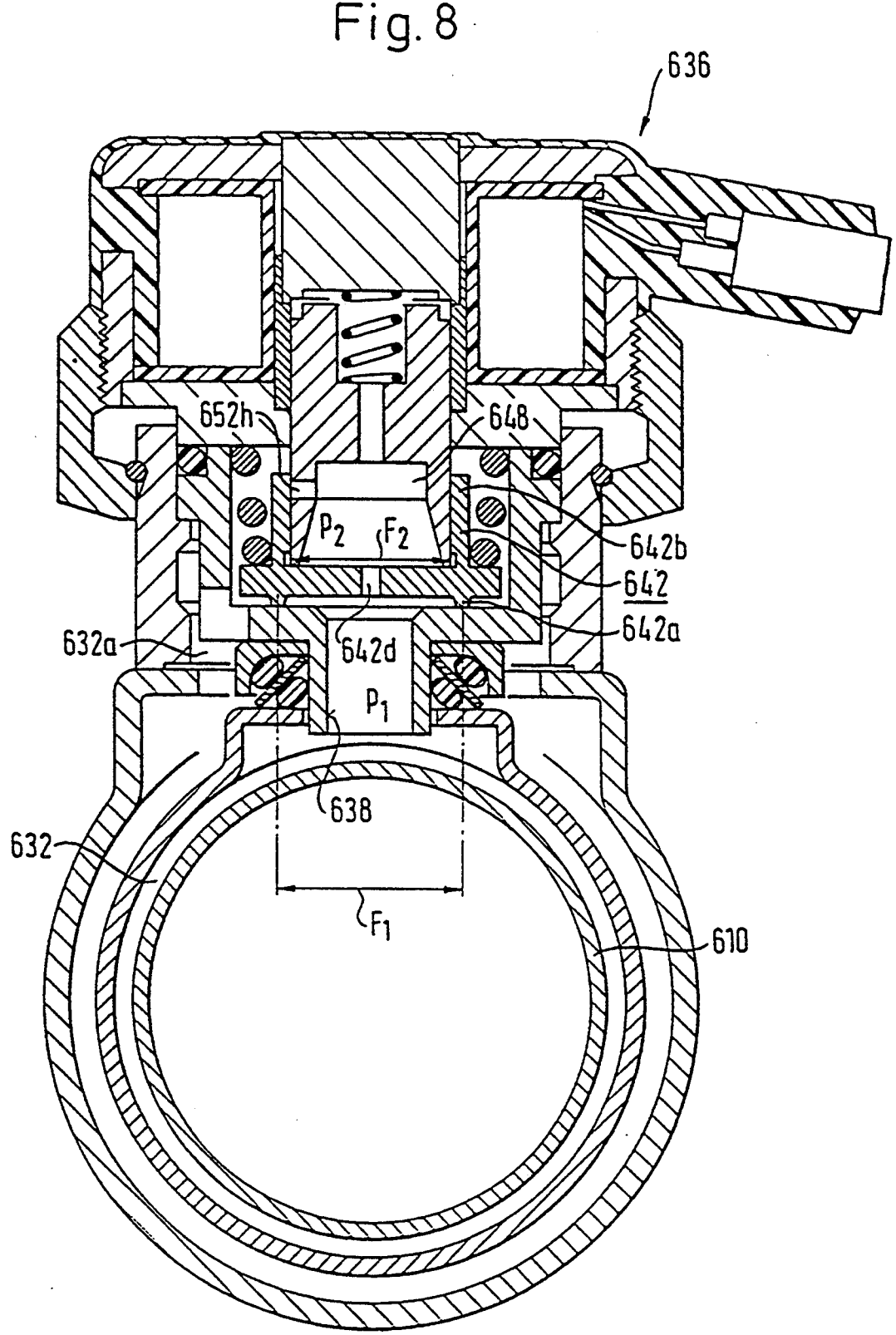
FIG. 8 shows a seventh preferred embodiment of the shut-off valve assembly of the vibration damper.

A further example of a shut-off valve assembly is shown in FIG. 8. This embodiment is described hereinafter only in so far as it differs from the aforedescribed embodiments, similar parts being identified by the same reference numerals as in FIG. 2 but increased by 600.

The embodiment shown in FIG. 8 corresponds substantially to that shown in FIG. 3. The annular flange 642a of the valve shut-off element 642 does however have a larger diameter than the annular flange 142a of the valve shutoff element 142 in FIG. 3. Consequently, also with this example of embodiment, the surface area $F_1$ of the valve shut-off element 642 to which the pressure $p_1$ in the central passage 638 is applied is larger than the surface area $F_2$ which is subject to the pressure $p_2$ in the control chamber 648. Consequently, it is also possible with this embodiment to achieve a set of characteristic curves which extend as indicated in FIG. 13, for the same reasons as explained in connection with FIG. 6.

Figure 9:
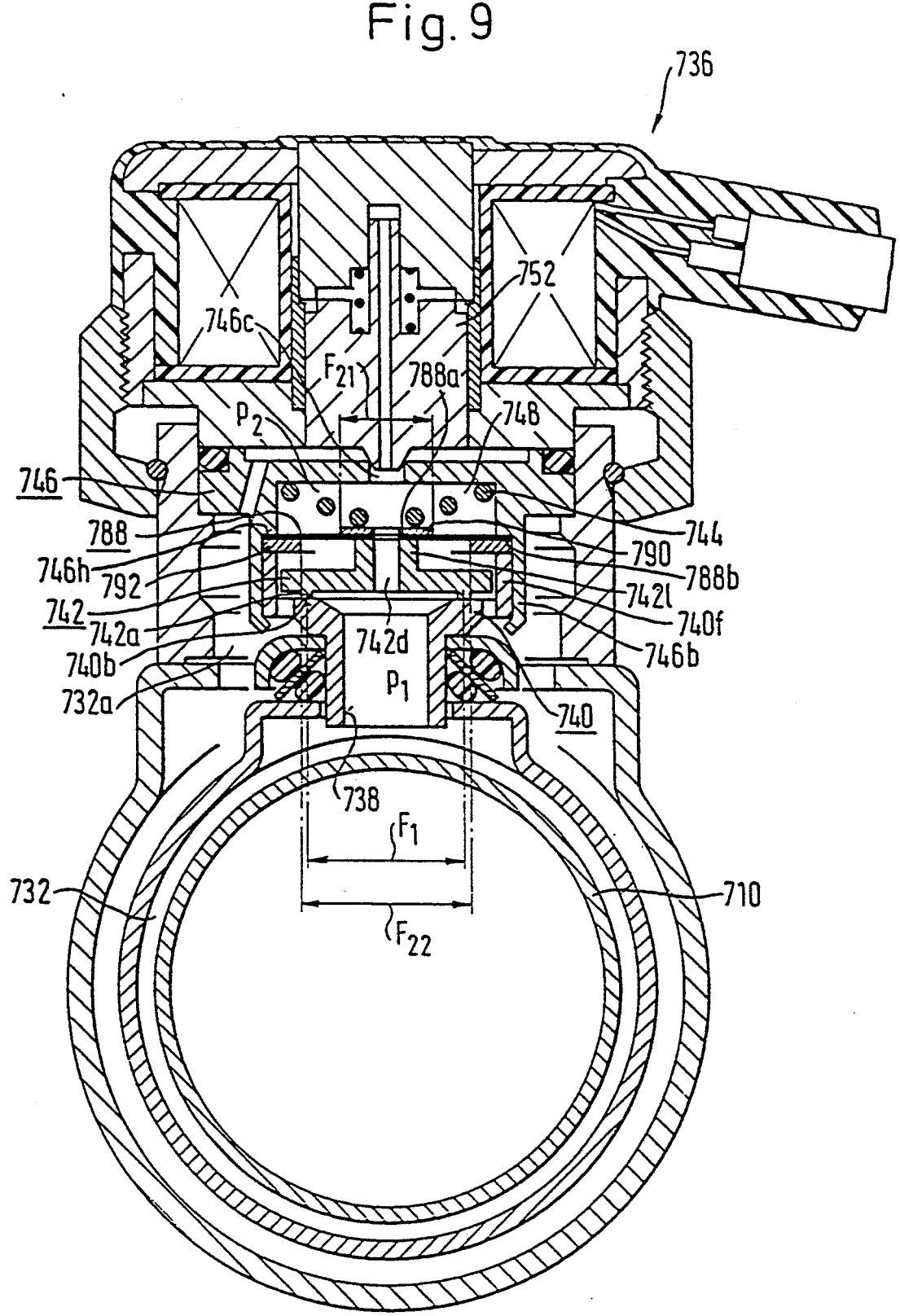
FIG. 9 shows an eighth preferred embodiment of the shut-off valve assembly of the vibration damper.

A further example of embodiment is shown in FIG. 9. Hereinafter, this example of embodiment will only be described in so far as it differs from the aforedescribed examples, similar parts being identified by the same reference numerals as in FIG. 2 but increased by 700.

Where this example of embodiment is concerned, the valve seat member 740 is of pot-shaped construction and has an upwardly extending tubular extension piece 740f. The tubular extension piece 740f is enclosed in sealing-tight manner by the side wall 746b of the intermediate member 746. The valve shut-off element 742 has an annular flange 742a by which it is seated on the valve seat 740b. A diaphragm 788 formed from an elastic material has its inner peripheral edge 788a gripped between an annular disc 790 and a tubular connector 742l projecting upwardly from the shut-off valve member 742, its outer peripheral edge 788b being clamped between a shoulder 746h of the intermediate member 746 and an annular disc-shaped intermediate member 792 which rests on the tubular extension piece 740f. A coiled thrust spring 744 tensions the valve shut-off element 742 against the valve seat 740b.

The control chamber 748 is bounded by the intermediate member 746, the diaphragm 788 and the annular disc 790. The pressure $p_1$ prevailing in the central passage 738 acts upon a surface area $F_1$ of the valve shut-off element 742. The pressure $p_2$ prevailing in the control chamber 748 acts on a surface $F_{21}$ of the annular disc 790 and a surface area $F_{22}-F_{21}$ of the diaphragm 788. Indeed, the total responsive area $F_{22}$ for the pressure $p_2$ is greater than the surface area $F_1$ available to the pressure $p_1$ but by virtue of its elasticity and the fact that it is supported by the bracing member 792, the diaphragm 788 is not able to transmit to the valve shut-off element 742 the hydraulic force corresponding to its surface area $F_{22}-F_{21}$. The surface area $F_{22}-F_{21}$ is such that in the example of embodiment shown in FIG. 9 the hydraulic force exerted on the valve shut-off element 742 by the pressure $p_1$ prevailing in the central passage 738 is greater than the hydraulic force exerted on the valve shut-off element 742 by the pressure $p_2$ prevailing in the control chamber 743 when the control chamber outlet 746c is closed by the magnetic armature 752, i.e. when the pressure $p_1$ in the central passage 738 and the pressure $p_2$ in the control chamber 748 are at the same level. Consequently, also with this embodiment of shut-off valve assembly 736 it is possible to obtain a range of characteristic curves according to FIG. 13, for the same reasons as described in connection with FIG. 6.

Figure 10:
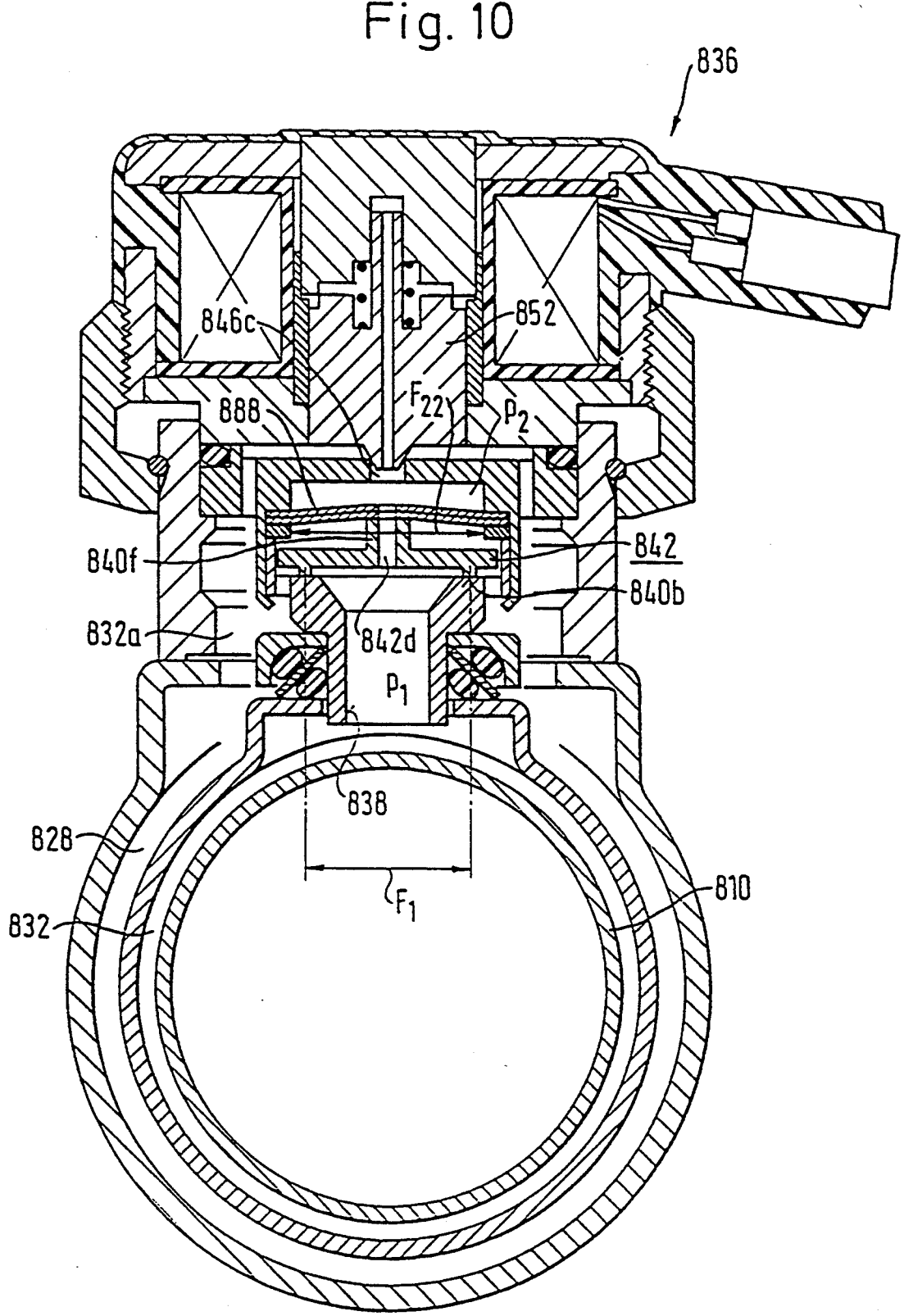
FIG. 10 shows a ninth preferred embodiment of the shut-off valve assembly of the vibration damper.

In the case of the embodiment of shut-off valve assembly 836 shown in FIG. 10, the diaphragm 888 consists of plate springs which initially tension the valve shut-off element 842 against the valve seat 840b. In this example of embodiment, therefore, there is no need to provide a separate pretensioning spring for the valve shut-off element 842. It is also possible to dispense with the separate use of an annular disc corresponding to the annular disc 790 since the diaphragm 888 is held on the tubular extension piece 840f of the valve shut-off element 842 by its own initial tension. The hydraulic forces exerted on the valve shut-off element 842 are subject to the same considerations as intimated hereinabove when describing FIG. 9: the hydraulic force exerted on the valve shut-off element 842 by the pressure $p_1$ prevailing in the central passage 838 is greater than the hydraulic force exerted on the valve shut-off element 842 by the pressure $p_2$ prevailing in the control chamber 848 when the control chamber outlet 846c is closed by the magnetic armature 852, i.e. when the pressure $p_1$ in the central passage 838 and the pressure $p_2$ in the control chamber 848 are at the same level. Thus, also with this embodiment of shut-off valve assembly 836, it is possible to achieve a range of characteristic curves according to FIG. 13, for the same reasons as were described in connection with FIG. 6.

According to the invention, a vibration damper was proposed which permits of outstanding adaptation of the damping pattern to the vehicle vibrations without additional regulating intervention during the damper stroke. To achieve the desired damping characteristics of the vibration damper, it is no longer necessary to regulate back and forth between individual portions of different characteristic curves of the band. Instead, it is sufficient to choose just one single characteristic curve.

The preliminary control valve of a motor car vibration damper which establishes the subsidiary current through-flow rate is so constructed that for a total pressure difference of 10 bars between the pressure prevailing in the high pressure section and the pressure prevailing in the low pressure section, a throughflow rate of 10 1/min can be let through. To this end, the maximum cross-section of opening of the control chamber inlet or control chamber outlet in the case of a motor car vibration damper amounts to at least 3 sq.mm.

A range of characteristic curves particularly appropriate to a vibration damper can be made available if the bend points connecting the parabolically extending first portion of the characteristic curve and the linearly extending second portion of the characteristic curve are, with increasing control chamber outlet cross-section, shifted from high pressure and low throughflow rate, for example 80 bars and 1 1/min, to low pressure and high throughflow rate, for example 5 bars and 10 1/min. In order to achieve such a band of characteristic curves, it is possible on the one hand, for the same responsive surface areas of the valve shut-off element for the pressure prevailing in the central passage and the pressure prevailing in the control chamber, for both the control chamber outlet and also the control chamber inlet to have a variable opening cross-section or on the other, for a constant opening cross-section of the control chamber inlet, the responsive surface area which is acted upon by the pressure prevailing in the central passage, to be larger than the surface acted upon by the pressure prevailing in the control chamber.

While specific embodiments of the invention have been shown and described in detail to illustrate the application of the inventive principles, it will be understood that the invention may be embodied otherwise without departing from such principles.

The references numerals in the claims are only used for facilitating the understanding and are by no means restrictive.

We claim:

1. A vibration damper comprising:
   a cylinder with an axis;
   a piston rod passing movably in an axial direction through at least one end of the cylinder;
   a piston connected inside the cylinder to the piston rod;
   a plurality of fluid chambers variable in capacity in relation to one another as a function of the movement of the piston rod relative to the cylinder;
   fluid connections between at least two of the fluid chambers;
   at least one of the fluid connections comprising a shut-off valve assembly between a first section and a second section of said at least one of the fluid connections, the shut-off valve assembly being constructed with at least one valve seat adjacent to which there is said first section;
   a valve shut-off element having a first side and a second side remote from the first side, the first side being pressable resiliently against the valve seat into a shut-off position for the first section;
   a control chamber located adjacent to the second side of the valve shut-off element remote from the first side of the valve shut-off element, the second side being subjected to the action of the fluid pressure in said control chamber, the control chamber being connected to the first section via a throttle section which passes through the valve shut-off element;
   a control chamber outlet, via which the control chamber communicates with the second section; and
   an externally controlled outlet cross-section dimensioning means associated with said control chamber outlet for dimensioning and outlet cross-section value of said control chamber outlet, said outlet cross-section dimensioning means being adjustable to a plurality of positions corresponding to a respective plurality of outlet cross-section values of said control chamber outlet;
   wherein when the outlet cross-section dimensioning means is set for a maximum outlet cross-section value of the control chamber outlet, the valve shut-off element starts to lift off from the valve seat when a throughflow rate through the control chamber outlet, which rate is defined as a throughflow quantity per unit of time, amounts to at least 0.2 times a total throughflow rate through the shut-off valve assembly that results in response to a damper velocity of 1 m/sec.

2. A vibration damper according to claim 1, wherein both the maximum outlet cross-section value of the control chamber outlet and a cross-section value of the throttle section amount to at least 1/150 of a fluid displacement cross-section of the vibration damper.

3. A vibration damper according to claim 1, wherein independent of the outlet cross-section value of the control chamber outlet the valve shut-off element starts to lift off the valve seat at least above an outlet cross-section limit value of the control chamber outlet, at a predetermined throughflow rate through the control chamber outlet, the lifting off occurring with diminishing outlet cross-section value of the control chamber outlet and increasing pressure difference between a pressure prevailing in the first section and a pressure prevailing in the second section.

4. A vibration damper according to claim 3, wherein:
   the valve shut-off element, when in its shut-off position, has on both its sides substantially identical surface areas for the pressure prevailing in the first section and the pressure prevailing in the control chamber; and
   wherein a cross-section value of the throttle section is independent of the outlet cross-section value of the control chamber outlet.

5. A vibration damper according to claim 1, wherein:
   independent of the outlet cross-section value of the control chamber outlet the valve shut-off element starts to lift off the valve seat above an outlet cross-section limit value of the control chamber outlet, at a predetermined throughflow rate through the control chamber outlet, the lifting off occurring for diminishing outlet cross-section value of said control chamber outlet with increasing pressure difference between a pressure prevailing in the first section and a pressure prevailing in the second section; and
   wherein the lifting of the valve shut-off element off the valve seat starts at less than the outlet cross-section limit value of the control chamber outlet with further diminishing outlet cross-section value of the control chamber outlet regardless of a throughflow rate through the control chamber outlet at a constant predetermined pressure difference between the pressure prevailing in the first section and the pressure prevailing in the second section.

6. A vibration damper according to claim 5, wherein:
   the valve shut-off element, when in its shut-off position, has on both its sides substantially identical surface areas available to or for application of the pressure prevailing in the first section and the pressure prevailing in the control chamber;
a cross-section value of the throttle section is independent of the outlet cross-section value of the control chamber outlet; and
wherein there is a pressure-relief valve which opens from the control chamber to the second section at the predetermined pressure difference.

7. A vibration damper according to claim 1, wherein:
lifting off of the valve shut-off element starts for diminishing outlet cross-section value of the control chamber outlet with diminishing throughflow rates through the control chamber outlet and increasing pressure difference between a pressure prevailing in the first section and a pressure prevailing in the second section.

8. A vibration damper according to claim 7, wherein:
the valve shut-off element, when in its shutting-off position, has on both its sides constant surface areas available for the pressure prevailing in the first section and the pressure prevailing in the control chamber; and
wherein a cross-section value of the throttle section diminishes with diminishing outlet cross-section value of the control chamber outlet.

9. A vibration damper according to claim 8, wherein the cross-section value of the throttle section diminishes more slowly than the outlet cross-section value of the control chamber outlet.

10. A vibration damper according to claim 7, wherein:
the valve shut-off element, when in its shutting-off position, has on both its sides constant surface areas available for the pressure prevailing in the first section and the pressure prevailing in the control chamber such that, when the control chamber outlet is closed, a hydraulic force exerted on the valve shut-off element by the pressure in the first section is greater than a hydraulic force exerted on the valve shut-off element by the pressure in the control chamber; and
wherein a cross-section value of the throttle section is independent of the outlet cross-section value of the control chamber outlet.

11. A vibration damper according to claim 1, wherein the shut-off valve assembly is disposed on the cylinder.

12. A vibration damper according to claim 1, wherein the vibration damper is a twin-tube vibration damper in which a first one of the fluid chambers is isolated from a second one of the fluid chambers by a piston, the first and second chambers are connected to each other by a piston valve, another one of the fluid chambers is a compensating chamber which is connected by a bottom valve to the first fluid chamber which is close to a cylinder bottom, and said at least one of the fluid connections containing the shut-off valve assembly extends to the compensating chamber from the second fluid chamber which is remote from the cylinder bottom.

13. A vibration damper comprising:
a cylinder with an axis;
a piston rod passing movably in an axial direction through at least one end of the cylinder;
a piston connected inside the cylinder to the piston rod;
a plurality of fluid chambers variable in capacity in relation to one another as a function of a movement of the piston rod relative to the cylinder;
at least one fluid connection between at least two of the fluid chambers;
said at least one fluid connection comprising a control valve assembly between a first section, in which a first section fluid pressure prevails, and a second section, in which a second section fluid pressure prevails, of said at least one fluid connection, the control valve assembly being constructed with at least one valve seat adjacent to which there is said first section;
a valve control element having a first side nearer to said valve seat and a second side farther from said valve seat;
resilient means exerting a biasing force on said valve control element such as to urge said first side of said valve control element toward a valve seat abutting position with respect to said valve seat;
a control chamber located adjacent to the second side of the valve control element;
a throttle section providing a fluid communication between the first section and the control chamber even if the valve control element is in the valve seat abutting position;
control chamber outlet means extending between said control chamber and said second section;
an externally controlled outlet cross-section dimensioning means associated with said control chamber outlet means for adjusting an outlet cross-sectional area of said control chamber outlet means to a plurality of cross-sectional area values;
said control chamber outlet means permitting a control chamber fluid throughflow from said first section to said second section via said throttle section, said control chamber and said control chamber outlet means depending on respective cross-sectional area values of said outlet cross-sectional area of said control chamber outlet means;
said first side of said valve control element being subjected to a first section side fluid force provided by said first section fluid pressure prevailing in said first section; said second side of said valve control element being subjected to a control chamber side fluid force provided by a control chamber fluid pressure prevailing in said control chamber;
said valve control element being liftable from said valve seat in response to a lifting relationship between the magnitudes of said biasing force, said first section side fluid force and said control chamber side fluid force;
lifting start influencing means being provided for influencing the start of lifting off said valve control element from said valve seat such that at least for cross-sectional area values above a predetermined cross-sectional area value of the control chamber outlet means the valve control element starts to lift from said valve seat in response to an increasing pressure difference between said first section fluid pressure and said second section fluid pressure at a substantially constant throughflow rate of said control chamber fluid throughflow irrespective of the respective cross-sectional area value of said outlet cross-sectional area of said control chamber outlet means.

14. A vibration damper comprising:
a cylinder with an axis;
a piston rod passing movably in an axial direction through at least one end of the cylinder;

a piston connected inside the cylinder to the piston rod;

a plurality of fluid chambers variable in capacity in relation to one another as a function of a movement of the piston rod relative to the cylinder;

at least one fluid connection between at least two of the fluid chambers;

said at least one fluid connection comprising a control valve assembly between a first section, in which a first section fluid pressure prevails, and a second section, in which a second section fluid pressure prevails, of said at least one fluid connection, the control valve assembly being constructed with at least one valve seat adjacent to which there is said first section;

a valve control element having a first side nearer to said valve seat and a second side farther from said valve seat;

resilient means exerting a biasing force on said valve control element such as to urge said first side of said valve control element toward a valve seat abutting position with respect to said valve seat;

a control chamber located adjacent to the second side of the valve control element;

a throttle section providing a fluid communication between the first section and the control chamber even if the valve control element is in the valve seat abutting position;

control chamber outlet means extending between said control chamber and said second section;

an externally controlled outlet cross-section dimensioning means associated with said control chamber outlet means for adjusting an outlet cross-sectional area of said control chamber outlet means to a plurality of cross-sectional area values;

said control chamber outlet means permitting a control chamber fluid throughflow from said first section to said second section via said throttle section, said control chamber and said control chamber outlet means depending on respective cross-sectional area values of said outlet cross-sectional area of said control chamber outlet means;

said first side of said valve control element being subjected to a first section side fluid force provided by a first section fluid pressure prevailing in said first section;

said second side of said valve control element being subjected to a control chamber side fluid force provided by a control chamber fluid pressure prevailing in said control chamber;

said valve control element being liftable from said valve seat in response to a lifting relationship between the magnitudes of said biasing force, said first section side fluid force and said control chamber side fluid force;

lifting start influencing means being provided for influencing the start of lifting off said valve control element from said valve seat such that for decreasing cross-sectional area values the valve control element starts to lift from said valve seat in response to an increasing pressure difference between said first section fluid pressure and said second section fluid pressure at decreasing throughflow rates of said control chamber fluid throughflow.

15. A vibration damper comprising:
a cylinder with an axis;

a piston rod passing movably in an axial direction through at least one end of the cylinder;

a piston connected inside the cylinder to the piston rod;

a plurality of fluid chambers variable in capacity in relation to one another as a function of a movement of the piston rod relative to the cylinder;

at least one fluid connection between at least two of the fluid chambers;

said at least one fluid connection comprising a control valve assembly between a first section, in which a first section fluid pressure prevails, and a second section, in which a second section fluid pressure prevails, of said at least one fluid connection, the control valve assembly being constructed with at least one valve seat adjacent to which there is said first section;

a valve control element having a first side nearer to said valve seat and a second side farther from said valve seat;

resilient means exerting a biasing force on said valve control element such as to urge said first side of said valve control element toward a valve seat abutting position with respect to said valve seat;

a control chamber located adjacent to the second side of the valve control element;

a throttle section providing a fluid communication between the first section and the control chamber even if the valve control element is in the valve seat abutting position;

control chamber outlet means extending between said control chamber and said second section;

an externally controlled outlet cross-section dimensioning means associated with said control chamber outlet means for adjusting an outlet cross-sectional area of said control chamber outlet means to a plurality of cross-sectional area values;

said control chamber outlet means permitting a control chamber fluid throughflow from said first section to said second section via said throttle section, said control chamber and said control chamber outlet means depending on respective cross-sectional area values of said outlet cross-sectional area of said control chamber outlet means;

said first side of said valve control element being subjected to a first section side fluid force provided by a first section fluid pressure prevailing in said first section;

said second side of said valve control element being subjected to a control chamber side fluid force provided by a control chamber fluid pressure prevailing in said control chamber;

said valve control element being liftable from said valve seat in response to a lifting relationship between the magnitudes of said biasing force, said first section side fluid force and said control chamber side fluid force;

one of first and second lifting start influencing means being provided for influencing the start of lifting off said valve control element from said valve seat, said first lifting start influencing means being such that at least for cross-sectional area values above a predetermined cross-sectional area value of the control chamber outlet means the valve control element starts to lift from said valve seat in response to an increasing pressure difference between said first section fluid pressure and said second section fluid pressure at a substantially constant throughflow rate of said control chamber fluid throughflow irrespective of the respective cross-sectional area value of said outlet cross-sectional area of said control chamber outlet means, and said second lifting start influencing means being such that for decreasing cross-sectional area values the valve control element starts to lift from said valve seat in response to an increasing pressure difference between said first section fluid pressure and said second section fluid pressure at decreasing throughflow rates of said control chamber fluid throughflow.

16. A vibration damper according to claim 13, wherein:

the valve control element, when in its valve seat abutting position, has on its first side and on its second side substantially equal surface areas that are exposed to the first section fluid pressure prevailing in the first section and the control chamber fluid pressure prevailing in the control chamber, respectively; and wherein the throttle section has a throttle section cross-sectional area independent of the respective cross-sectional area value of the outlet cross-sectional area of the control chamber outlet means.

17. A vibration damper according to claim 13, wherein for cross-sectional area values below said predetermined cross-sectional area value of the control chamber outlet means the valve control element starts to lift from said valve seat in response to an increasing pressure difference between said first section fluid pressure and said second section fluid pressure at a substantially constant pressure difference between said first section fluid pressure and said second section fluid pressure irrespective of the respective cross-sectional area value of the control chamber outlet means.

18. A vibration damper according to claim 17, wherein:

the valve control element, when in its valve seat abutting position, has on its first side and on its second side substantially equal surface areas that are exposed to the first section fluid pressure prevailing in the first section and the control chamber fluid pressure prevailing in the control chamber respectively; and wherein the throttle section has a throttle section cross-sectional area independent of the respective cross-sectional area value of the outlet cross-sectional area of the control chamber outlet means; and a pressure-relief valve is provided which starts to open from the control chamber to the second section at the substantially constant pressure difference.

19. A vibration damper according to claim 13, wherein for cross-sectional area values below said predetermined cross-sectional area value of the control chamber outlet means the valve control element starts to lift from said valve seat in response to an increasing pressure difference between said first section fluid pressure and said second section fluid pressure at decreasing throughflow rates of said control chamber fluid throughflow smaller than said substantially constant throughflow rate.

20. A vibration damper according to one of claims 13, 14 and 15, wherein the control valve assembly is disposed on the cylinder.

21. A vibration damper according to any one of claims 13, 14 and 15, wherein the vibration damper is a twin-tube vibration damper in which a first one of the fluid chambers is isolated from a second one of the fluid chambers by a piston, the first and second fluid chambers are connected to each other by a piston valve, another one of the fluid chambers is a compensating chamber which is connected by a bottom valve to the first fluid chamber which is close to a cylinder bottom, and said at least one of the fluid connections containing the shut-off valve assembly extends to the compensating chamber from the fluid chamber which is remote from the cylinder bottom.

22. A vibration damper according to one of claims 13, 14 and 15, wherein, when the outlet cross-section dimensioning means is set for a maximum cross-sectional area value of the outlet cross-sectional area of the control chamber outlet means, the valve control element starts to lift from the valve seat when said control chamber fluid throughflow amounts to at least 0.2 times a total throughflow through the control valve assembly that results in response to a damper velocity of 1 m/sec.

23. A vibration damper according to claim 22, wherein both the maximum cross-sectional area value of the outlet cross-sectional area of the control chamber outlet means and a throttle section cross-sectional area of the throttle section amount to at least 1/150 of a fluid displacement cross-section of the vibration damper.

24. A vibration damper according to claim 14, wherein:

the valve control element, when in its valve seat abutting position, has on its first side and on its second side constant surface areas that are exposed to the first section fluid pressure prevailing in the first section and the control chamber fluid pressure prevailing in the control chamber, respectively; and wherein the throttle section has a throttle section cross-sectional area which diminishes with diminishing cross-sectional area value of the outlet cross-sectional area of the control chamber outlet means.

25. A vibration damper according to claim 24, wherein the throttle section cross-sectional area of the throttle section diminishes more slowly than the cross-sectional area value of the outlet cross-sectional area of said control chamber outlet means.

26. A vibration damper according to claim 14, wherein:

the valve control element, when in its valve seat abutting position, has on its first side and on its second side constant surface areas that are exposed to the first section fluid pressure prevailing in the first section and the control chamber fluid pressure prevailing in the control chamber, respectively, such that, when the outlet cross-section dimensioning means is set for a minimum cross-sectional area value of the outlet cross-sectional area of the control chamber outlet means, said first section side fluid force exerted on the valve control element by the first section fluid pressure is greater than said control chamber side fluid force exerted on the valve control element by the control chamber fluid pressure; and wherein the throttle section has a throttle section cross-sectional area independent of the respective cross-sectional area value of the outlet cross-sectional area of the control chamber outlet means.

27. A vibration damper comprising:

a cylinder with an axis;

a piston rod passing movably in an axial direction through at least one end of the cylinder;

a piston connected inside the cylinder to the piston rod;

a plurality of fluid chambers variable in capacity in relation to one another as a function of a movement of the piston rod relative to the cylinder;

at least one fluid connection between at least two of the fluid chambers;

said at least one fluid connection comprising a control valve assembly between a first section, in which a first section fluid pressure prevails, and a second section, in which a second section fluid pressure prevails, of said at least one fluid connection, the control valve assembly being constructed with at least one valve seat adjacent to which there is said first section;

a valve control element having a first side nearer to said valve seat and a second side farther from said valve seat;

resilient means exerting a biasing force on said valve control element such as to urge said first side of said valve control element toward a valve seat abutting position with respect to said valve seat;

a control chamber located adjacent to the second side of the valve control element;

a throttle section providing a fluid communication between the first section and the control chamber even if the valve control element is in the valve seat abutting position;

control chamber outlet means extending between said control chamber and said second section;

an externally controlled outlet cross-section dimensioning means associated with said control chamber outlet means for adjusting an outlet cross-sectional area of said control chamber outlet means to a plurality of cross-sectional area values;

said control chamber outlet means permitting a control chamber fluid throughflow from said first section to said second section via said throttle section, said control chamber and said control chamber outlet means depending on respective cross-sectional area values;

said first side of said valve control element being subjected to a first section side fluid force provided by said first section fluid pressure prevailing in said first section;

said second side of said valve control element being subjected to a control chamber side fluid force provided by a control chamber fluid pressure prevailing in said control chamber;

said valve control element being liftable from said valve seat in response to a lifting relationship between the magnitudes of said biasing force, said first section side fluid force and said control chamber side fluid force;

wherein, when the outlet cross-sectional dimensioning means is set for a maximum cross-sectional area value of the outlet cross-sectional area of the control chamber outlet means, the valve control element starts to lift from the valve seat when said control chamber fluid throughflow amounts to at least 0.2 times a total throughflow through the control valve assembly that results in response to a damper velocity of 1 m/sec.

28. A vibration damper according to claim 27, wherein both the maximum cross-sectional area value of the outlet cross-sectional area of the control chamber outlet means and a throttle section cross-sectional area of the throttle section amount to at least 1/150 of a fluid displacement cross-section of the vibration damper.

* * * * *

UNITED STATES PATENT AND TRADEMARK OFFICE
CERTIFICATE OF CORRECTION

PATENT NO. : 5,398,787
DATED : March 21, 1995
INVENTOR(S) : Felix Woessner and Manfred Grundei It is certified that error appears in the above-indentified patent and that said Letters Patent is hereby corrected as shown below:

Col. 4, line 24, "in" should read --in that the--;
Col. 11, line 49, "after" should read --after another--;
Col. 14, lines 63-64, "difference" should read --differs--.

Signed and Sealed this

Thirteenth Day of June, 1995

Attest:

BRUCE LEHMAN

Attesting Officer       Commissioner of Patents and Trademarks